US009749994B2

(12) United States Patent
Fong et al.

(10) Patent No.: US 9,749,994 B2
(45) Date of Patent: Aug. 29, 2017

(54) FEEDBACK OF CHANNEL QUALITY INFORMATION IN A MULTI-CARRIER ENVIRONMENT

(71) Applicant: Apple Inc., Cupertino, CA (US)

(72) Inventors: Mo-Han Fong, L'Orginal (CA); Hang Zhang, Nepean (CA); Sophie Vrzic, Nepean (CA); Robert Novak, Ottawa (CA); Jun Yuan, Kanata (CA); Dong-Sheng Yu, Ottawa (CA)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/944,295

(22) Filed: Jul. 17, 2013

(65) Prior Publication Data

US 2013/0301535 A1    Nov. 14, 2013

Related U.S. Application Data

(63) Continuation of application No. 12/921,672, filed as application No. PCT/IB2009/000476 on Mar. 10, 2009, now Pat. No. 9,247,531.
(Continued)

(51) Int. Cl.
*H04W 72/04* (2009.01)
*H04W 48/10* (2009.01)
(Continued)

(52) U.S. Cl.
CPC ....... *H04W 72/0406* (2013.01); *H04L 1/1812* (2013.01); *H04L 5/0055* (2013.01);
(Continued)

(58) Field of Classification Search
CPC ................................................. H04W 72/0406
See application file for complete search history.

(56) References Cited

U.S. PATENT DOCUMENTS

2002/0169008 A1* 11/2002 Hiben et al. .................. 455/574
2004/0209621 A1   10/2004 Teshirogi
(Continued)

FOREIGN PATENT DOCUMENTS

CA    2618616 A1    2/2007
CN    1366781 A     8/2002
(Continued)

OTHER PUBLICATIONS

Specification of U.S. Appl. No. 61/020,690, filed Jan. 11, 2008.*
(Continued)

*Primary Examiner* — Jason Mattis
(74) *Attorney, Agent, or Firm* — Meyertons, Hood, Kivlin, Kowert & Goetzel, P.C.

(57) ABSTRACT

Mechanisms for feedback of channel quality information (CQI) in a multi-carrier environment are disclosed. A mobile station may include one or more antennas, and a transceiver coupled to the one or more antennas. The transceiver may be configured to receive (e.g., simultaneously) signals on a plurality of carriers. Each of the carriers may include synchronization channels. The transceiver may be further configured to, for each of one or more of the carriers: generate channel quality information (CQI) for the carrier based on pilot signals in the carrier; transmit the CQI for the carrier. The one or more carriers for which CQI is generated and transmitted may be determined by configuration information received from a base station.

20 Claims, 26 Drawing Sheets

Related U.S. Application Data

(60) Provisional application No. 61/035,363, filed on Mar. 10, 2008.

(51) Int. Cl.

| | | |
|---|---|---|
| *H04L 1/18* | (2006.01) | |
| *H04W 24/10* | (2009.01) | |
| *H04W 72/08* | (2009.01) | |
| *H04W 88/06* | (2009.01) | |
| *H04L 5/00* | (2006.01) | |
| *H04W 48/12* | (2009.01) | |
| *H04W 48/14* | (2009.01) | |

(52) U.S. Cl.
CPC ........... *H04L 5/0057* (2013.01); *H04W 24/10* (2013.01); *H04W 48/10* (2013.01); *H04W 72/042* (2013.01); *H04W 72/0446* (2013.01); *H04W 72/0453* (2013.01); *H04W 72/085* (2013.01); *H04W 88/06* (2013.01); *H04W 48/12* (2013.01); *H04W 48/14* (2013.01)

(56) References Cited

U.S. PATENT DOCUMENTS

| | | | |
|---|---|---|---|
| 2006/0280142 A1 | 12/2006 | Damnjanovic et al. | |
| 2007/0026810 A1 | 2/2007 | Love et al. | |
| 2007/0098053 A1* | 5/2007 | Rinne .................. | H04L 5/0023 375/149 |
| 2007/0230405 A1* | 10/2007 | Yin et al. ...................... | 370/335 |
| 2007/0254595 A1* | 11/2007 | Yoon et al. ................ | 455/67.14 |
| 2008/0020779 A1* | 1/2008 | Ode et al. ..................... | 455/450 |
| 2008/0039133 A1 | 2/2008 | Ma et al. | |
| 2008/0049813 A1 | 2/2008 | Kurose et al. | |
| 2008/0056227 A1 | 3/2008 | Love et al. | |
| 2008/0056387 A1 | 3/2008 | Sakar et al. | |
| 2008/0095252 A1* | 4/2008 | Kim et al. .................... | 375/260 |
| 2008/0253336 A1* | 10/2008 | Parkvall et al. ............. | 370/335 |
| 2009/0060010 A1* | 3/2009 | Maheshwari ......... | H04L 1/0029 375/211 |
| 2009/0168718 A1* | 7/2009 | Wang et al. .................. | 370/330 |
| 2009/0185632 A1* | 7/2009 | Cai et al. ...................... | 375/260 |
| 2010/0098005 A1* | 4/2010 | Lee et al. ...................... | 370/329 |
| 2010/0220675 A1* | 9/2010 | Chun et al. ................... | 370/329 |
| 2010/0296473 A1* | 11/2010 | Kim et al. .................... | 370/329 |

FOREIGN PATENT DOCUMENTS

| | | |
|---|---|---|
| CN | 1886947 A | 12/2006 |
| CN | 1934802 A | 3/2007 |
| CN | 101115052 A | 1/2008 |
| CN | 101128028 | 2/2008 |
| EP | 1799003 | 6/2007 |
| JP | 2002010348 | 1/2002 |
| JP | 2003115796 | 4/2003 |
| JP | 2006135716 | 5/2006 |
| JP | 2007043696 | 2/2007 |
| JP | 2007116639 A | 5/2007 |
| JP | 2007295523 | 11/2007 |
| KR | 10-2006-0079103 | 7/2006 |
| KR | 20070080556 A | 8/2007 |
| KR | 20070093657 | 9/2007 |
| KR | 10-2008-0016652 | 2/2008 |
| WO | 2004089013 | 10/2004 |
| WO | 2006071096 | 7/2006 |
| WO | 2007035045 | 3/2007 |
| WO | 2007044414 A1 | 4/2007 |
| WO | 2007052769 | 5/2007 |
| WO | 2007127993 | 8/2007 |
| WO | 2007113457 | 10/2007 |

OTHER PUBLICATIONS

Office Action from Japanese Application No. 2013-231445, issued Nov. 11, 2014, English and Japanese versions, pp. 1-12.
Final Office Action from Japanese Application No. 2010-550278, issued Jun. 2, 2014, English and Japanese versions, pp. 1-16.
Notice of Allowance from Japanese Application No. 2010550278, issued Dec. 8, 2014, English and Japanese versions, pp. 1-7.
Extended European Search Report from 09719817.0-1854, issued Sep. 23, 2014, Apple Inc., pp. 1-10.
"Downlink Control Signaling for Frame Structure Design of IEEE 802.16", Youngsoo Yuk, et al., Jan. 2008, pp. 1-16.
Final Office Action, Japanese Application No. 2013231445, mailed Jul. 8, 2015, 6 pages.
Non-Final Office Action, Korean Application No. 10-2010-7022569, mailed Jun. 5, 2015, 7 pages.
Office Action, Chinese Application No. 201310298747.5, mailed Jul. 29, 2015, 21 pages.
Pre-Appeal Review Report, Japanese Application No. 2013-231445, mailed Mar. 3, 2016, 3 pages.
Fong et al., "Proposal for IEEE 802.16m Control Structure Framework", submitted Mar. 10, 2008, 8 pages.
Chinese Office Action, Application No. 201310298747.5, mailed Apr. 29, 2016, 11 pages.
Office Action for Korean Patent Application No. 10-2016-7012510, Aug. 9, 2016, pp. 1-6.
Chinese Office Action, Application No. 201310581242, mailed Feb. 5, 2016, 21 pages.
NTT DoCoMo, "Physical Channels and Multiplexing in Evolved UTRA Downlink", Discussion and Decision, Jun. 20-21, 2005, 24 pages, Sophia Antipolis, France.
Office Action, Korean Application No. 10-2015-7002785, mailed Dec. 3, 2015, 5 pages.
Office Action, Korean Application No. 10-2010-7022569, mailed Jan. 24, 2016, 5 pages.
Office Action for Korean Patent Application No. 10-2015-7002785, Sep. 29, 2016, pp. 1-7.
Office Action for Japanese Patent Application No. 2015-219877, Oct. 4, 2016, pp. 1-9.
Office Action for Chinese Patent Application No. 201310581242.X, Mar. 20, 2017, pp. 1-10.

* cited by examiner

Types of DL Control Information (1/3)

| Control information type | Examples | Characteristics | Control channel design |
|---|---|---|---|
| 1) Essential static system-wide PHY information for decoding of DL PHY frames/sub-frames | Bandwidth configurations, CP sizes, multi-carrier configuration, system time, TDD ratio, guard tones. | Static system-wide deployment specific parameters.<br><br>Required for fast initial access during network entry. MS should be able to decode these information after synchronization | Information should be broadcast either a) periodically or b) triggered or b) by initial ranging event.<br><br>If case a), these information should be carried in a fixed resource location within a superframe. In case b), the presence/absence of the information is signaled by a Broadcast Pointer Channel (BPCH).<br><br>Information should be delivered with very high reliability. |
| 2) Essential pseudo-dynamic sector-wide PHY information for decoding of DL PHY frames/sub-frames (i.e. superframe configuration control information) | Channelization (partitioning of diversity zone, localized zone, pilot structure etc.), legacy/16m resource partition, sub-frame control configuration etc. Can contain initial ranging region/codes information for MS to do fast initial access procedure | Information can change from one superframe to another. Required for fast initial access during network entry and handover. MS should be able to decode these information after synchronization and information in 1). | Information should be broadcast periodically every superframe.<br><br>These information should be carried in a fixed resource location within a superframe.<br><br>Information should be delivered with very high reliability. |

*FIG. 6*

Types of DL Control Information (2/3)

| Control information type | Examples | Characteristics | Control channel design |
|---|---|---|---|
| 3) Non-PHY system information | BSID, operator ID, subnet ID etc. | Static system information | Since information is static. It doesn't have to be periodically broadcast to MSs. It can be sent by unicast to a MS during initial network entry.<br><br>These information does not have to be carried in a fixed resource location. |
| 4) PHY/MAC system configuration information | Handover parameters, power control parameters, fast feedback region, ranging region etc. | Semi-static system configuration information. Configuration parameters values can change in a slow fashion (in order of seconds/minutes/hours). | For MS already entered the network, there is no need to broadcast the information in frequent manner if the information hasn't changed. The control channel design should support efficient power saving for sleep mode and idle mode MS while ensuring any changes in the system configuration is received by the MS in timely fashion.<br><br>For MS performing initial network entry, the system configuration information is sent as unicast message to the MS during network entry procedure to expedite the network entry. Note that BS has to already completed initial ranging procedure with MS. |

*FIG. 7*

Types of DL Control Information (3/3)

| Control information type | Examples | Characteristics | Control channel design |
|---|---|---|---|
| 5) Neighbor BS information | Information types 3) and 4) of neighbor BSs | As indicated in previous slide for type 3) and 4) | Information can be broadcast periodically or event triggered. The information can also be unicast to MS who wants to add a neighbor BS to the active set. |
| 6) Paging information | Quick paging and regular paging information | Non-periodic information. Event driven. | Information should be broadcast whenever there is one or more MS to page. |
| 7) Dynamic DL and UL resource allocation and control information related to traffic burst assignment | Burst assignment related information: MCS, MIMO mode, resource location, user ID<br><br>ACK/NAK of UL traffic<br><br>UL power control | Dynamically changes every sub-frame | Control information is unicast if the traffic burst is unicast. Control information is multi-cast/broadcast if the traffic burst is multicast/broadcast. Resource location indication is multicast.<br><br>Refer to other appendices for details. |

FIG. 8

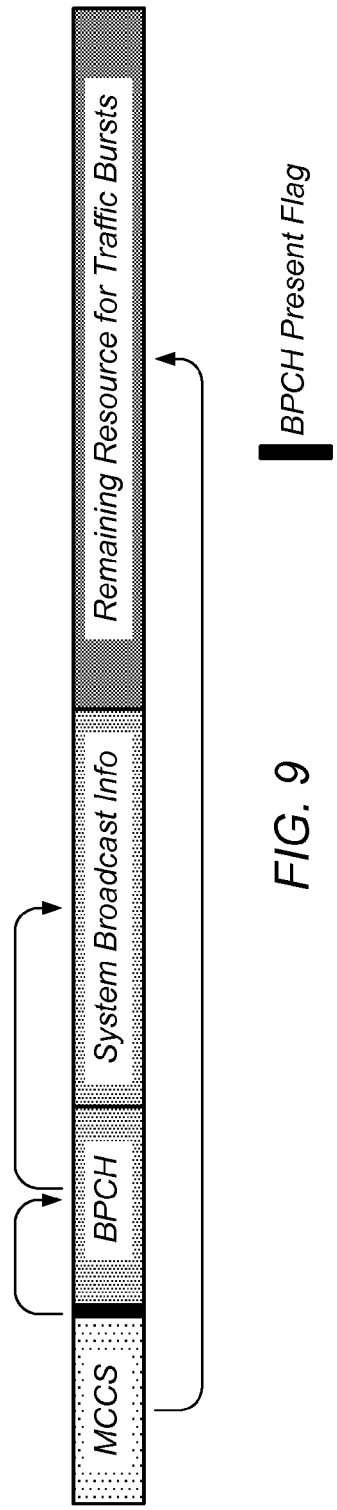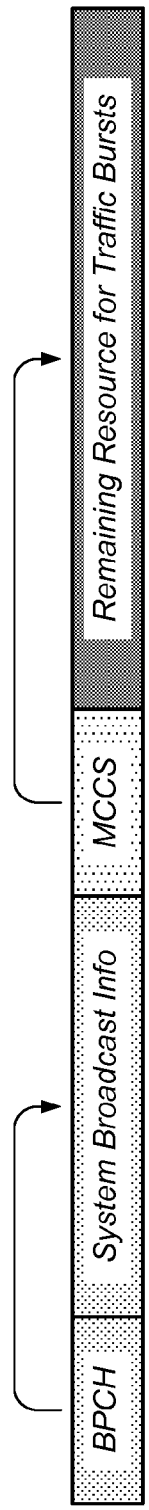
FIG. 9
FIG. 10

| Resource Allocation | Pros | Cons |
|---|---|---|
| One dimensional, with a channelization tree | • Lower overhead than two dimensional | • Reduced flexibility as well as resource granularity<br>• The overhead increases with higher granularity |
| Two dimensional | • More flexibility | • High overhead |

FIG. 11

| Multicast/Unicast Control | Pros | Cons |
|---|---|---|
| Multicast | • Common information can be signaled once<br>• Better suited when a group of MS shares the same attributes | • Power must be targeted to the lowest geometry user that is assigned |
| Unicast | • Power efficient | • Common information must be signaled to each user individually |

FIG. 12

| TDM versus FDM of Control and Data | Pros | Cons |
|---|---|---|
| TDM | • Allows for micro-sleep | • Less effective power boosting due to lower pooling efficiency<br>• Control channel granularity is one symbol |
| FDM | • Power can be boosted<br>• Increased control channel granularity<br>• Simplifies power management | • Does not allow for micro-sleep |

FIG. 13

| Combination Index | Number of Partitions | Partitioning of 10 Available Resources |
|---|---|---|
| 0 | 1 | 10 |
| 1 | 2 | 1,9 |
| 2 | 2 | 2,8 |
| 3 | 2 | 3,7 |
| ... | ... | ... |
|  | 3 | 1,1,8 |
|  | 3 | 1,2,7 |
|  | ... | ... |
|  | 10 | 1,1,1,1,1,1,1,1,1,1, |

FIG. 16

| Number of Available Resources (N) | Maximum Number of Assignments Using a 10 Bit CI | Comment |
|---|---|---|
| <23 | N | All combinations can be signaled with one CI |
| 23 | 10 | Two CIs are needed if there are more than 10 assignments |
| 24 | 8 | Two CIs are needed if there are more than 8 assignments |

FIG. 17

| Permutation Index | Number of Assignments | Sub-band Allocations |
|---|---|---|
| 0 | 1 | 4 |
| 1 | 2 | 1,3 |
| 2 | 2 | 2,2 |
| 3 | 2 | 3,1 |
| 4 | 3 | 1,1,2 |
| 5 | 3 | 1,2,1 |
| 6 | 3 | 2,1,1 |
| 7 | 4 | 1,1,1,1 |

FIG. 18

| Number of DL Non-MIMO Assignments | WiMAX Reference System Overhead (%) | UMB Overhead (%) | Nortel Overhead (%) |
|---|---|---|---|
| 1 | 9.82 | 1.67 | 0.78 |
| 5 | 10.71 | 5.00 | 2.05 |
| 10 | 11.83 | 8.33 | 3.65 |

FIG. 24

| Number of DL MIMO Assignments (4 Layers) | WiMAX Reference System Overhead (%) | UMB Overhead (%) | Nortel Overhead (%) |
|---|---|---|---|
| 1 | 9.82 | 1.67 | 1.01 |
| 5 | 10.71 | 8.33 | 3.21 |
| 10 | 11.83 | 16.67 | 5.96 |

FIG. 25

| Partition Divisions (in Resource Elements) | Index Number | Bitfield |
|---|---|---|
| 1,1,1,1 | 0 | 000 |
| 1,1,2 | 1 | 001 |
| 1,2,1 | 2 | 010 |
| 2,1,1 | 3 | 011 |
| 3,1 | 4 | 100 |
| 1,3 | 5 | 101 |
| 2,2 | 6 | 110 |
| 4 | 7 | 111 |

| Users Combinations (e.g. Users Numbered 1 through 4 in Order of Assignment in Bitmap) | Index Number | Bitfield |
|---|---|---|
| 1 and 2; 3 and 4 | 0 | 00 |
| 1 and 3; 2 and 4 | 1 | 01 |
| 1 and 4; 2 and 3 | 2 | 10 |
| Reserved Field | 3 | 11 |

| Example Assignment Ordering (3 Assignments) | Index Number | Bitfield |
|---|---|---|
| *1;2;3; | *0 | *000 |
| *1;3;2; | *1 | *001 |
| *2;1;3; | *2 | *010 |
| *2;3;1; | *3 | *011 |
| *3;1;2; | *4 | *100 |
| *3;2;1; | *5 | *101 |
| *Reserved 1 | *6 | *110 |
| *Reserved 2 | *7 | *111 |

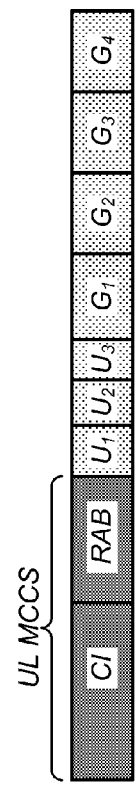
FIG. 42
| Number of Users | 16e with 3 Sub-MAPs | 16m Group Assignment Proposal | | | 3GPP2 UMB |
|---|---|---|---|---|---|
| | | Non-Persistent | Persistent + Non-Persistent | Persistent + Non-Persistent (with 2-Bit STF) | Persistent Re-Transmission |
| 100 | 30% | 7.1% | 5.1% | 5.4% | 5.9% |
| 200 | 51% | 8.1% | 6.1% | 6.6% | 7.4% |
| 300 | 70% | 9.2% | 7.1% | 7.9% | 8.8% |
| 400 | 87% | 10.3% | 8.1% | 9.2% | 10.2% |
FIG. 43
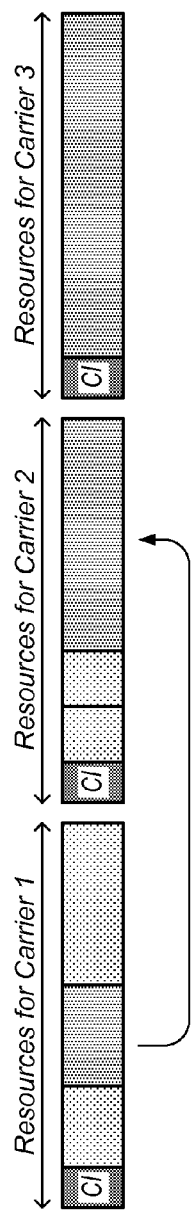
FIG. 44

FEEDBACK OF CHANNEL QUALITY INFORMATION IN A MULTI-CARRIER ENVIRONMENT

This application claims the benefit of U.S. provisional patent application Ser. No. 61/035,363 filed Mar. 10, 2008, the disclosure of which is incorporated herein by reference in its entirety.

FIELD OF THE DISCLOSURE

This disclosure relates to methods for control signaling for wireless systems.

BACKGROUND

In most wireless communication systems, one or more base stations facilitate wireless communications with any number of mobile stations through a wireless interface. A significant amount of information must be exchanged between the base stations and the various mobile stations to enable communications therebetween. This information is generally defined as control information. An exemplary wireless communication system is defined by the Institute of Electrical and Electronics Engineers (IEEE) 802.16 standards as set forth by the Broadband Wireless Access Working Group for Wireless Metropolitan Area Networks (MAN). The IEEE 802.16 standard is commonly referred to as WiMAX, which stands for Worldwide Interoperability for Microwave Access.

The system requirements for the IEEE 802.16 standard are set forth in the IEEE 802.16m standards, and like many other wireless communication systems, much of the control information that is used for system access, the transmission and reception of traffic packets, and handovers from one base station to the next, is often transmitted and retransmitted ad nauseum, regardless of whether the mobile stations actually need to receive the information. In many instances, the mobile stations are in sleep or idle modes, or already have received and stored the control information. As such, the excessive retransmission of control information that is either not needed by the mobile stations or has already been received by the mobile stations significantly increases control overhead, wastes communication resources, and harms power efficiencies due to the mobile stations having to remain awake to receive and process control information that is either not necessary or is already available.

Accordingly, there is a need for a technique to more efficiently disseminate control information to mobile stations in wireless communication environments, including those defined by the IEEE 802.16 standards and others, in an effective and efficient manner. There is a further need for a technique to ensure that the mobile stations efficiently obtain control information as necessary while reducing the need to receive and process control information that has already been received or is not relevant for operation.

SUMMARY OF THE DETAILED DESCRIPTION

To effectively and efficiently provide control information, a broadcast pointer channel (BPCH) may be used to identify the type and perhaps relative location of control information that is being provided in a given frame structure, such as a sub-frame, frame, or superframe. A sub-frame (or like framing entity, such a frame or superframe) may have a BPCH and a corresponding system control information segment in which control information may reside. The system control information segment may have any number of control information blocks, wherein each control information block that is present may correspond to a particular type of control information. The BPCH is used to identify the type of control information that is present in a corresponding system control information segment, and if needed or desired, the relative locations of the various control information.

For example, the BPCH may include presence flags for the different types of control information wherein the presence flags are set according to the presence or absence of corresponding control information in the system control information segment. If the system control information segment for a frame includes certain control information in corresponding control information blocks, the BPCH may have flags that correspond to this control information set to indicate the presence of such information, while other flags that correspond to other types of control information are set to indicate the absence of other control information types. The BPCH may also provide the location, length, or the like of the corresponding control information blocks within the system control information segment, such that the mobile station can determine the precise location of the control information in the system control information segment. Each control information block may correspond to a different type of control information or a group of control information types.

Mobile stations can quickly and efficiently determine what control information is present in a sub-frame, whether the control information that is present is relevant, as well as the location of any or all of the control information in the sub-frame. As such, the mobile station can avoid decoding control information that is not relevant. In practice, this means that the mobile station can quickly assess the need to decode the remainder of a sub-frame or at least the portion of the sub-frame that relates to control information once it has determined whether the sub-frame contains relevant control information.

Those skilled in the art will appreciate the scope of the present invention and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the invention, and together with the description serve to explain the principles of the invention.

FIGS. 6-8 are tables disclosing seven types of control information.

FIG. 9 illustrates the use of a "BPCH present flag" which indicates the presence or absence of the Broadcast Pointer Channel (BPCH). The "present" case is illustrated.

FIG. 10 illustrates the use of a BPCH to decode system broadcast information.

FIG. 11 is a table showing Pros and Cons associated with one dimensional (with a channelization tree) and two dimensional resource allocation.

FIG. 12 is a table showing Pros and Cons associated with multicast and unicast control.

FIG. 13 is a table showing Pros and Cons associated with TDM versus FDM of control and data.

FIG. 16 is a table showing the number of partitions and the partitioning of 10 available resources for each value of the combination index.

FIG. 17 is a table showing number of available resources versus maximum number of assignments using a 10 bit CI.

FIG. 18 is a table showing an example of a permutation index look-up table for the case where there are 4 sub-bands.

FIGS. 24 and 25 are Tables for control channel overhead comparison.

FIG. 42 illustrates an example of a resources map—uplink control segment.

FIG. 43 is a table illustrating an assignment overhead comparison for different numbers of users.

FIG. 44 shows a unicast message on Carrier 1, where the unicast message indicates that data in contained in a third partition of Carrier 2.

DETAILED DESCRIPTION

The embodiments set forth below represent the necessary information to enable those skilled in the art to practice the invention and illustrate the best mode of practicing the invention. Upon reading the following description in light of the accompanying drawings, those skilled in the art will understand the concepts of the invention and will recognize applications of these concepts not particularly addressed herein. It should be understood that these concepts and applications fall within the scope of the disclosure and the accompanying claims.

Figure 1:
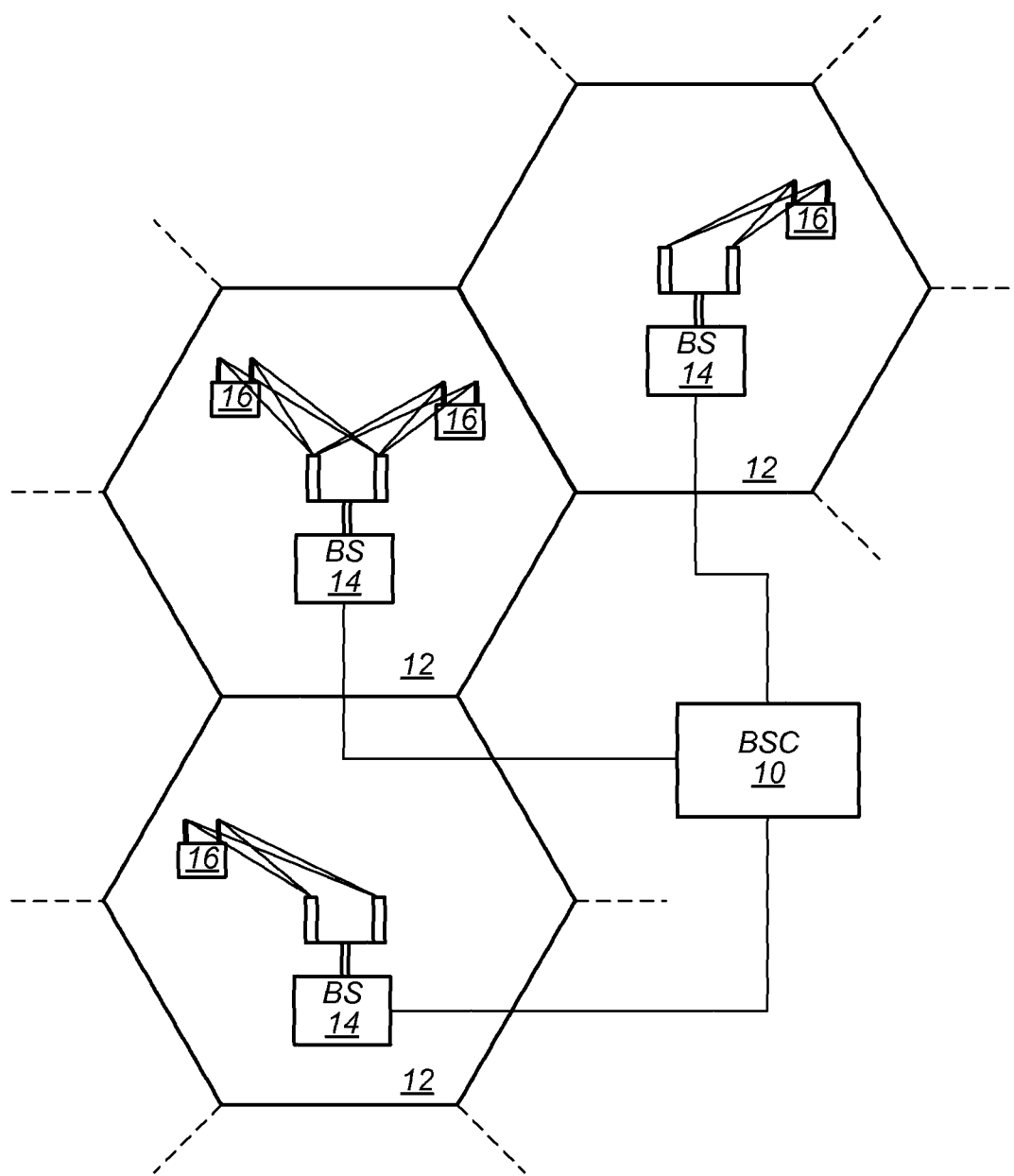
FIG. 1 is a block representation of a communication environment according to one embodiment of the disclosure.

Prior to delving into the details of the present invention, an overview of an exemplary communication environment in which the present invention may be employed is described. With particular reference to FIG. 1, a portion of a cellular network is depicted wherein a base station controller (BSC) 10 serves a plurality of cells 12. Each cell 12 represents the primary coverage area of a particular base station (BS) 14 that is operating under the control of the BSC 10. The base stations 14 are capable of facilitating bi-directional communications through any number of communication technologies with mobile stations (MS) 16 that are within communication range of the base stations 14, and thus within a corresponding cell 12. Communications throughout the cellular network may support voice, data, and media communications.

Figure 2:
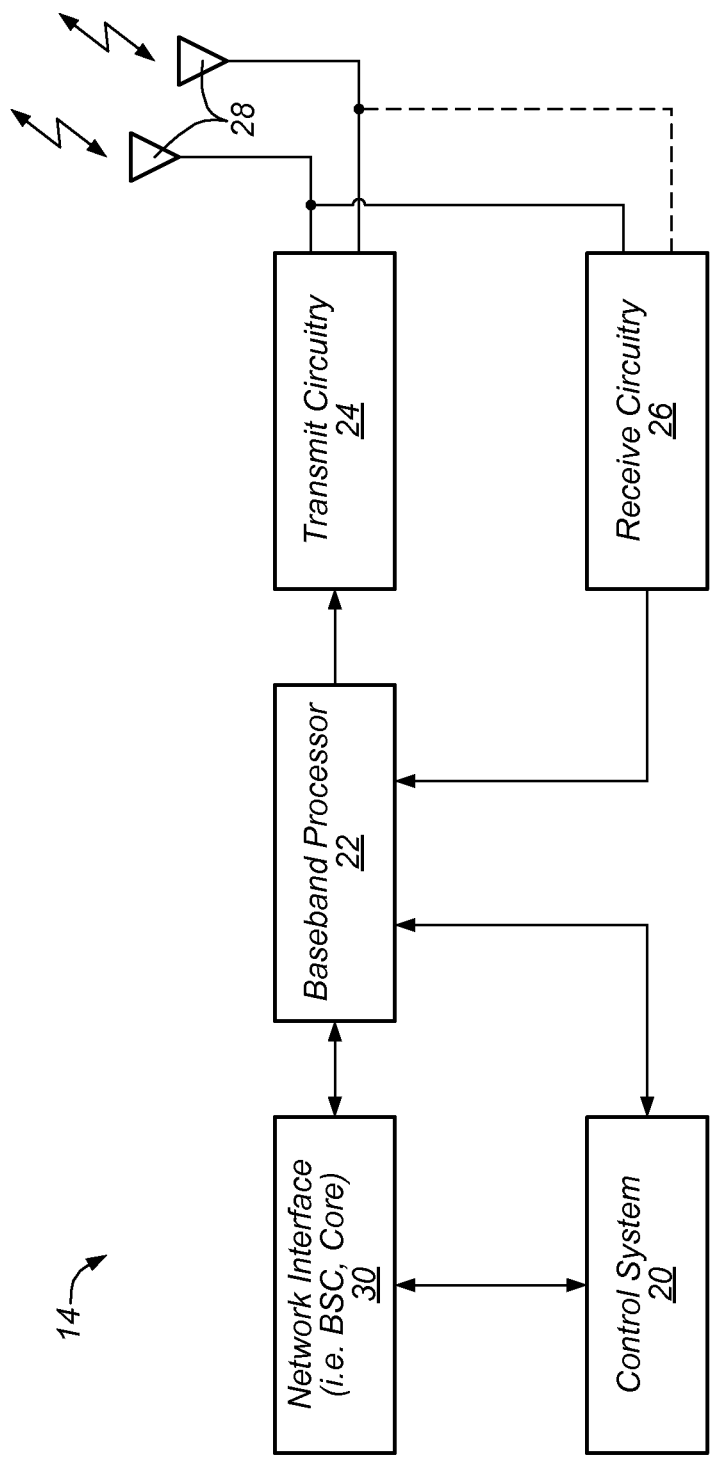
FIG. 2 is a block representation of a base station according to one embodiment of the disclosure.

With particular reference to FIG. 2, a base station 14 configured according to one embodiment of the disclosure is illustrated. Notably, the base station 14 may support any type of wireless communication technology, such as traditional cellular technologies employing orthogonal frequency division multiple access (OFDMA), code division multiple access (CDMA), and time division multiple access (TDMA), and local wireless technologies. Although not limited thereto, the concepts of the present invention are applicable to the IEEE 802.16 standards as set forth by the Broadband Wireless Access Working Group for Wireless Metropolitan Area Networks (MAN), and in particular to the System Requirements for the IEEE 802.16 standards as set forth in section the IEEE 802.16m. This family of standards is incorporated herein by reference in its entirety. Notably, the technology defined by the IEEE 802.16 family of standards is often referred to as WiMAX (Worldwide Interoperability for Microwave Access).

Accordingly, the base station 14 may act as any wireless access point that supports wireless communications. The base station 14 will preferably be able to support unicast, multicast, and broadcast communications and effect the requisite control signaling to enable and control the same. The base station 14 generally includes a control system 20, a baseband processor 22, transmit circuitry 24, receive circuitry 26, one more antennas 28, and a network interface 30. The receive circuitry 26 receives radio frequency signals bearing information from one or more remote transmitters provided by mobile stations 16. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs). The received information is then sent toward the core network via the network interface 30 or transmitted toward another mobile station 16 serviced by the base station 14. The network interface 30 will typically interact with the core network via the base station controller 10.

On the transmit side, the baseband processor 22 receives digitized data, which may represent voice, data, or control information, from the network interface 30 under the control of the control system 20. The baseband processor encodes the data for transmission. The encoded data is output to the transmit circuitry 24, where it is used by a modulator to modulate a carrier signal that is at a desired transmit frequency or frequencies. A power amplifier (not shown) will amplify the modulated carrier signal to a level appropriate for transmission, and deliver the modulated carrier signal to one or more of the antennas 28 through a matching network.

Figure 3:
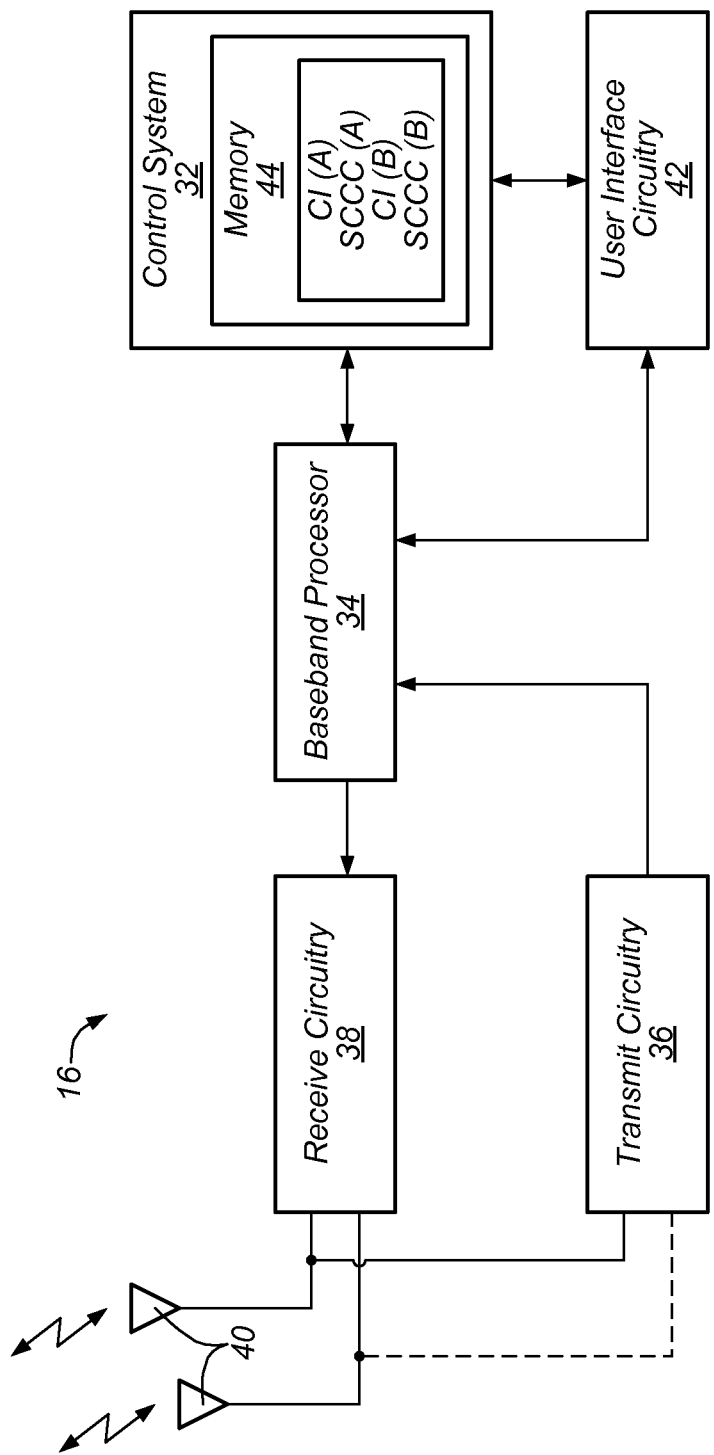
FIG. 3 is a block representation of a mobile station according to one embodiment of the disclosure.

With reference to FIG. 3, a mobile station 16 configured according to one embodiment of the disclosure is illustrated. The mobile station 16 will support a communication technology that is compatible with the base stations 14. The mobile station 16 will include a control system 32, a baseband processor 34, transmit circuitry 36, receive circuitry 38, one or more antennas 40, and user interface circuitry 42. The control system 32 will have memory 44 for storing the requisite software and data required for operation. The receive circuitry 38 receives radio frequency signals bearing information from one or more remote transmitters provided by base stations 14. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams. The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs).

For transmission, the baseband processor 34 receives digitized data, which may represent voice, data, media, or control information, from the control system 32, which the baseband processor 34 encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the one or more antennas 40 through a matching network. Various modulation and processing techniques available to those skilled in the art are applicable to the present invention.

Disclosed herein are various techniques to enhance the control signaling that necessarily occurs between the base stations 14 and the mobile stations 16 to support overall system operation. These techniques alone or in combination may reduce control overhead, save power, reduce processing requirements in the mobile stations 16 and base stations 14, allow faster network entry, save network resources, or any combination thereof. The control signaling allows the base stations 14 and the mobile stations 16 to communicate with each other to exchange important information and operational instructions, which are referred to as control information. Since the base station 14 is generally in control of communications, a large portion of the control information is disseminated by the base stations 14 to the mobile stations 16. The control information may be used to control system access, the transmission and reception of traffic packets, handovers, and the like.

Since the control information is varied in nature, different types of control information have different characteristics. For instance, different types of control information may vary in terms of frequency of change, whether it is unicast, multicast, or broadcast, how robust it needs to be, its importance to system access, and the like. Accordingly, different types of control information can be treated differently. The following description categorizes various types of control information, and based on how the information is categorized, effects delivery of the control information accordingly.

To provide perspective and highlight the inefficiencies of the current state of the art, reference is made to the scheduling control and system information is currently provided in the IEEE 802.16e standard. According to the IEEE 802,16e standard, scheduling information is sent in MAP messages, while system information is sent in separate uplink or downlink channels. In addition, neighboring base station information and paging information are broadcast in yet separate messages. Much, if not most, of this information is periodically retransmitted regardless of whether it actually needs to be. For example, some of the information provided in the MAP messages, such as space time coding information, ranging region information, and fast feedback ranging definitions, is not necessarily dynamic and therefore could be sent less frequently to reduce overhead. Some of the information provided in the uplink and downlink channels is static, and thus either does not need to be periodically broadcast by the base stations 14 to the mobile stations 16 that have already entered the network, or could be broadcast at much reduced rates. Such static information may include base station identifiers, operator identifiers, subnet identifiers, and time division duplex ratios.

Some of the information provided in the uplink and downlink channels is semi-static, and thus either does not need to be periodically broadcast by the base stations 14 to the mobile stations 16 if the information has not changed, could be broadcast at much reduced rates, or could be broadcast when the information changes. Such information may include burst profiles and handover parameters. Similarly, information for neighboring base stations is generally semi-static and does not need to be periodically broadcast to the mobile stations 16 that have already entered the network, assuming the information has not changed. From the above, one can see that the need to provide or update control information varies. While some control information is constantly changing, other control information may only change periodically, if at all.

As an example, control information can be categorized as being relatively static, semi-static, or dynamic. Static control information is relatively fixed. Semi-static control information will change on a periodic basis or in response to a defined event. Dynamic control information is information that may change on a relatively continuous basis.

Regardless of being static, semi-static, or dynamic, control information is typically delivered at defined locations in a framing structure wherein certain information is provided somewhere in a frame or group of frames each time the frame or group of frames is transmitted. While continuously providing dynamic control information may be necessary, continuously retransmitting static and semi-static control information that has not changed since the last transmission is very inefficient from both a processing and resource perspective.

With the present invention different types of control information may be sent at different times to increase efficiency. For example, control signaling overhead may be reduced by having the base station 14 transmit static system-wide information that provides essential physical layer configuration information that is needed by a mobile station 16 to perform initial system access procedures in response to the base station 14 detecting that the mobile station 16 is attempting to enter the network. This is in contrast to having the base station 14 transmitting such information in each frame or sub-frame regardless of network events or conditions. The physical layer configuration information is used by the mobile station 16 to establish communications with the base station 14 for network entry to the network supported by the base station 14. The base station 14 can transmit static system-wide information that provides machine access code (MAC) or other upper layer configuration information after the mobile station 16 performs initial system access using the physical layer configuration information. The upper layer configuration information is not needed for initial system access and can be unicast to the appropriate mobile station 16 to further increase overall system efficiency.

In the above scenario, the base station 14 may broadcast uplink ranging (or random access) information for the mobile station 16 that is entering the network to use when initiating uplink ranging (or random access) procedures. The mobile terminal 16 that is entering the network will receive the uplink ranging (or random access) information and use it to initiate the uplink ranging procedures required to gain entry to the network, wherein the procedures entail uplink transmission based on the uplink ranging or random access information as is known in the art.

In the IEEE 802.16m standard, the framing structure is as follows. A superframe includes four frames and is transmitted every 20 milliseconds. Each frame has eight sub-frames and is transmitted every five milliseconds. Each sub-frame generally corresponds to five, six, or seven OFDM symbols.

What follows provides a breakdown of different types of control information into seven different categories and an exemplary way of controlling the dissemination of the control information based on the corresponding categories. Delivery of the various types of control information may be based on appropriate events, conditions, or scheduling criteria. For the following example, the IEEE 802.16m framing structure is used; however, those skilled in the art will recognize the applicability of these concepts to different types of framing structures.

Type 1 control information is considered static and corresponds to essential system-wide physical layer information that is used by the mobile station 16 for decoding downlink physical layer frames/sub-frames that are received from the base station 14. Exemplary control information includes bandwidth configuration information, CP sizes, multi-carrier configuration information, system time, time division duplex (TDD) ratio information, guard tones, and the like. Type 1 control information generally includes static system-wide deployment specific parameters, which are required for fast initial access during network entry. Mobile stations 16 should be able to decode the type 1 information after synchronization with the serving base station or base stations 14. The type 1 control information should be delivered with very high reliability, and can be broadcast either periodically or in association with an initial ranging event. If broadcast periodically, the information should be carried in a fixed resource location within a superframe. If broadcast in association with an initial ranging event, the presence or absence of the control information is signaled by a broadcast pointer channel (BPCH), which will be described in further detail below.

Type 2 control information is considered pseudo-dynamic (or aggressively semi-static) and may change from one superframe to another, but may not change from one sub-frame to another or even be provided in any or sub-frame of a superframe. The Type 2 information corresponds to essential sector-wide physical layer information that is used by the mobile station 16 for decoding downlink physical layer frames/sub-frames. Type 2 information may include channelization information, legacy and 802.16m resource partitioning information, sub-frame control configuration information, superframe configuration control information, and the like. The channelization information may relate to the partitioning of diversity zones, localized zone and information, pilot structure and information, and the like. The type 2 information may also contain initial ranging region or code information that allows the mobile stations 16 to facilitate fast initial access procedures as set forth in the IEEE 802.16 standards. Since the type 2 control information is generally required for fast initial access during network entry and handover, the mobile station 16 should be able to decode this information after synchronization and receipt of the type 1 information. As indicated, the type 1 information may likely change from one superframe to another, and as such, should be broadcast periodically every superframe in a fixed resource location within a superframe or at the boundaries of superframes, wherein the fixed resource location is known by the mobile stations 16. Like the type 1 information, the type 2 information should be delivered with very high reliability.

Type 3 control information is considered static and corresponds to non-physical layer system information, such as base station identifiers, operator identifiers, subnet identifiers, and the like. This control information does not have to be periodically broadcast to the mobile stations 16 and can be unicast to the mobile stations 16 during initial network entry procedures. Further, this information does not have to be provided in a fixed resource location in a superframe, frame, or sub-frame.

Type 4 control information is semi-static physical layer or MAC layer configuration information such as handover parameters, power control parameters, fast feedback region information, ranging region information, and the like. The type 4 control information can change in a relatively slow fashion in the order of seconds, minutes, or hours as opposed to the dynamic control information that may be changing and need updating in periods of less than 100 milliseconds. For mobile stations 16 that are already entered in the network, there is no need to broadcast the type 4 information in a frequent manner, assuming the information has not changed. The design of the control channel should support efficient power saving for sleep and idle modes for the mobile station 16 while ensuring any changes in the system configuration are received by the mobile station 16 in a timely fashion. For mobile stations 16 that are performing initial network entry, the type 4 information may be sent as a unicast message to each mobile station 16 during network entry to expedite network entry, after the base station 14 has already completed the initial ranging procedures with the particular mobile station 16.

Type 5 control information relates to information of or related to neighboring base stations 14 with respect to the serving base station 14. The type 5 information may include static information corresponding to the type 3 information or semi-static information corresponding to the type 4 information. The type 5 control information may be broadcast periodically or in response to an event. The type 5 control information could also be unicast to any mobile station 16 that wants to add a neighboring base station 14 to an active set of base stations 14 that are currently serving the mobile station 16.

Type 6 control information is paging information that is semi-static and can be event driven. Whether quick paging or regular paging information, Type 6 control information is generally not periodic and should be broadcast whenever there are one or more mobile stations 16 to page, generally in association with at least one mobile station 16 entering the network.

Type 7 control information is dynamic and relates to downlink and uplink resource allocation and traffic burst assignment information, such as MCS, multiple-input multiple output (MIMO) mode, user identifier, resource allocation and the like. The type 7 control information may also encompass acknowledgements (ACKs) and negative acknowledgments (NAKs) of uplink traffic as well as power control information for uplink traffic. The type 7 control information may change every sub-frame and be unicast to a mobile station 16 if the traffic burst is unicast or multicast/broadcast to a group of mobile stations 16 if the traffic bust is multicast/broadcast. The resource location information for one or more mobile stations 16 being served by the base station 14 may be multicast to the group of mobile stations 16.

To effectively and efficiently provide control information, a broadcast pointer channel (BPCH) is used to identify the type and perhaps relative location of control information that is being provided in a given frame structure, such as a sub-frame, frame, or superframe. In operation, the base station 14 will identify the control information to provide in each sub-frame, generate the sub-frames, and transmit the sub-frames in a sequential fashion. For example, assume that control information corresponding to any one or more control information types 1, 3, 4, 5, and 6 may be present in a sub-frame or superframe boundary in an IEEE 802.16m frame structure. As such, type 3 and 4 control information may be provided in a first sub-frame while type 1 control information may be provided in a subsequent sub-frame, which may not include the type 3 and 4 control information. In one configuration, type 2 and 7 information is not identified by the BPCH.

A sub-frame (or like framing entity, such a frame or superframe) may have a BPCH and a corresponding system control information segment in which control information may reside. As described above, not every sub-frame needs have a BPCH and the control information provided in the system control information segment may vary. The system control information segment may have any number of control information blocks, wherein each control information block that is present may correspond to a particular type of control information. The BPCH is used to identify the type of control information that is present in a corresponding system control information segment, and if needed or desired, the relative locations of the different control information. For example, the BPCH may include presence flags for the different types of control information wherein the presence flags are set according to the presence or absence of corresponding control information in the system control information segment. If the control information segment for a frame includes type 3, 4, and 5 control information in corresponding control information blocks, the BPCH may have flags that correspond to type 3, 4, and 5 control information set to indicate the presence of such information while other flags that correspond to other types of control information are set to indicate the absence of other information types. The BPCH may also provide the location, length, or the like of the corresponding control information blocks within the system control information segment, such that the mobile station 16 can determine the precise location of the control information in the system control information segment. Each control information block may correspond to a different type of control information or a group of control information types.

With this configuration, mobile stations 16 can quickly and efficiently determine what control information is present in a sub-frame, whether the control information that is present is relevant, as well as the location of any or all of the control information in the sub-frame. As such, the mobile station 16 can avoid decoding control information that is not relevant. In practice, this means that the mobile station 16 can quickly assess the need to decode the remainder of a sub-frame or at least the portion of the sub-frame that relates to control information once it has determined whether the sub-frame contains relevant control information.

The ability to efficiently determine if relevant control information is present and relevant in a sub-frame is particularly beneficial when the mobile station 16 is not active and resides in a sleep or idle mode. This may be accomplished by monitoring the BPCH. In these modes, the mobile station 16 is not actively engage in supporting voice, data, or media communications, but will periodically wake to obtain or check for relevant control information. If the BPCH in a sub-frame that is being monitored indicates that no control information is present or control information is present, but not relevant to that particular mobile station 16, the mobile station 16 can quickly return to the sleep or idle mode without the need to decode the rest of the sub-frame, including any control information that is present but not relevant as well as any resource and allocation information (type 7) that may be provided in other portions of the sub-frame. The sooner the mobile station 16 can return to the sleep or idle modes, the more power is conserved.

When the BPCH in a sub-frame indicates that the control information is present and the mobile station 16 determines that the control information that is present is relevant to that mobile station 16, the mobile station 16 can decode the control information. In certain configurations, the mobile station 16 can selectively decode only that control information that is relevant, such that when a system control information segment has both relevant and irrelevant control information, the mobile station 16 can decode the relevant control information without decoding the irrelevant control information as well as any resource and allocation information (type 7) that may be provided in other portions of the sub-frame. By eliminating the need to decode irrelevant control information, the mobile station 16 can further save power. Again when different types of control information are present, whether in allocated control information blocks or otherwise, the BPCH may provide sufficient information to let the mobile station 16 determine the location of the relevant control information so as to avoid the need to decode the irrelevant control information. As such, the mobile station 16 can selectively decode all or a portion of any control information that is present in a sub-frame based on the BPCH. Importantly, not all sub-frames need to have control information at all in the system control information segment, let alone control information of a particular type.

Figure 4A:
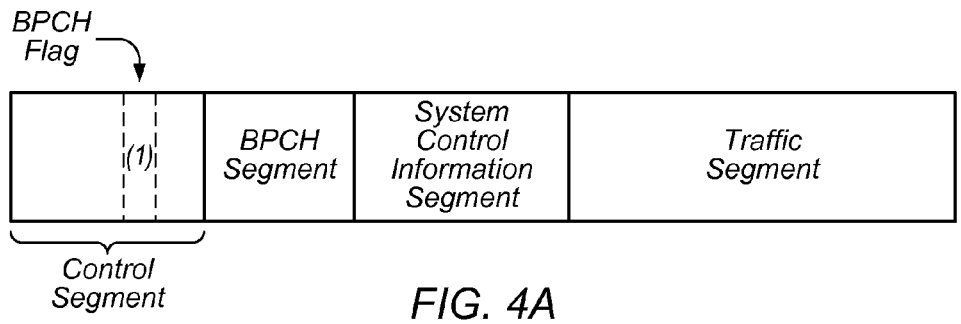
FIGS. 4A and 4B represent sub-frame configurations according to one embodiment of the disclosure.

As with control information, a BPCH may or may not be present in each sub-frame. The following examples illustrate two configurations for detecting the present of a BPCH. For the first configuration, reference is made to FIGS. 4A and 4B. In this configuration, the sub-frame includes a control segment, an optional BPCH segment, an optional system control information segment, and a traffic segment for traffic bursts. The control segment may contain information related to the partitioning of resources within the sub-frame for traffic bursts. The control segment may be of fixed length and location, which are known to the mobile station 16. The control segment is encoded and modulated in a known fashion. The traffic segment carries information defining allocation of resources for traffic bursts.

A BPCH presence flag is added to the control segment of the sub-frame to indicate the presence or absence of the BPCH and perhaps the type and location of control information, if any, that follows in the system control information segment. When present, the BPCH may be of fixed length and location, which are known to the mobile station 16. The BPCH may also be encoded and modulated in a known fashion. In operation, the mobile station 16 will process a sub-frame as follows. First, the mobile station 16 will decode the control segment and analyze the BPCH presence flag to determine whether the sub-frame includes a BPCH. If the BPCH presence flag (1) indicates that a BPCH is present in the sub-frame as in FIG. 4A, the mobile station 16 will decode and process the BPCH such that all control information or any relevant control information in the system control information segment can be decoded. Any relevant control information is then used by the mobile station 16 as desired. The remaining resources in the traffic segment are for traffic bursts and are partitioned based on information in the control segment. The mobile station 16 will handle the traffic bursts in traditional fashion in light of the control segment information.

Figure 4B:
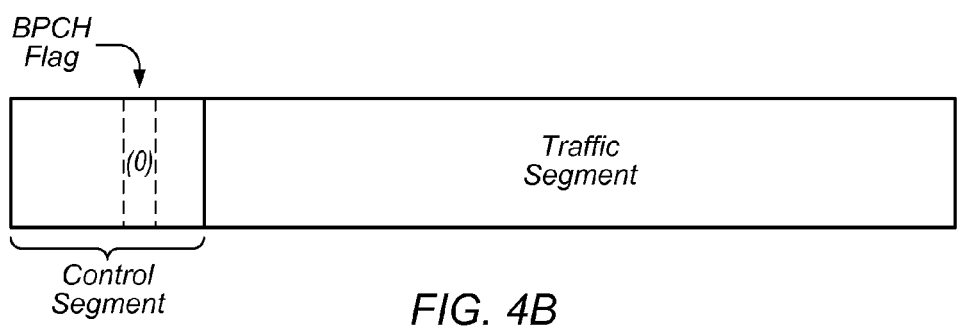

If the presence flag (0) indicates that a BPCH is not present in the sub-frame as in FIG. 4B, the mobile station 16 will recognize that the BPCH and the associated system control information segment are not present in the sub-frame. The remaining resources in the traffic segment are for traffic bursts and are partitioned based on information in the control segment. The mobile station 16 will handle the traffic bursts in traditional fashion in light of the control segment information.

Figure 5A:
FIGS. 5A and 5B illustrate sub-frame configurations according to a second embodiment of the disclosure.
Figure 5B:
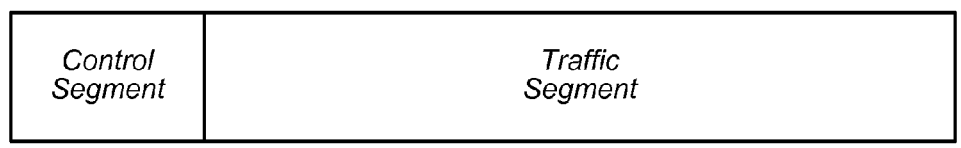

In the above configuration, a BPCH presence flag is provided in the control segment to indicate whether a BPCH, and thus a system control information segment, is present in the sub-frame. In the configuration of FIGS. 5A and 5B, no BPCH presence flag is employed. If the BPCH is present, it will be provided in a fixed location in the sub-frame and will have a fixed length as well as being provided with a fixed modulation and coding scheme (FIG. 5A). In operation, the mobile station 16 will first attempt to decode a BPCH at the location in the sub-frame where it expects to find the BPCH. If decoding is successful, the information provided in the BPCH will allow the mobile station 16 to identify and decode all or the relevant control information that is provided in the system control information segment, as described above. If the decoding is not successful, the mobile station 16 will determine that the BPCH is not present, and as such, there is no control information provided in the control segment (FIG. 5B). The mobile station 16 will then proceed to decode the control segment and the traffic bursts that are provided in the traffic segment of the sub-frame.

With semi-static control information, such as information types 4 and 5 as well as perhaps type 2, the base station 14 may take steps to inform the mobile stations 16 as to when the control information changes to enable further power savings by avoiding the need for the mobile stations to decode control information that has not been changed or updated. Control information, version information, and an action time for the control information may be sent from the base station 14 to the mobile stations 16 at the same or different times in the same or different messages. As the control information is updated, a new version number is assigned to the control information such that each version of the control information can be identified and tracked. The version number is referred to herein as a system configuration change count (SCCC). The action time identifies when the configuration information should take effect or be in effect. In general, the control information is downloaded by the mobile station 16 and implemented at the action time. Until the action time, the mobile station 16 will use the prior version of the control information.

In one configuration, the mobile station 16 may store current control information that is currently in effect as well as new control information in the memory 44 of the control system 32 that will take effect in the future at the designated action time. As shown in FIG. 3, the current control information (CI (A)) has a first SCCC (SCCC (A)) while the new control information (CI (B)) has a second SCCC (SCCC (B)), which is different from the first SCCC. Periodically and in a frequent manner, the base station 14 may send the current SCCC to identify the current control information that is in effect as well as a system configuration change alert (SCCA) flag to indicate whether new control information (that is different from the current control information) is being provided by the base station 14. Again, the new control information is generally control information that is scheduled to take place in the future. For example, the SCCC and the SCCA flag may be provided every superframe in the corresponding superframe configuration control (type 2) information.

By detecting the current SCCC value being provided by the base station 14, the mobile station 16 is aware of the current control information that should be in effect and in current use. Assuming the mobile station 16 has received and stored the current control information, the mobile station 16 will use the current control information until new control information is downloaded and the action time for switching to the new control information occurs. When the action time occurs, the new control information will become the current control information. If the mobile station 16 detects an SCCC value being provided by the base station 14 that corresponds to control information that is different from that being used, the mobile station 16 will either switch to the appropriate control information, if such control information is available in the memory 44, or cease uplink transmissions to the base station 14 and attempt to decode the appropriate control information from the downlink transmissions from the base station 14. Once the appropriate control information is recovered, the mobile station 16 will resume uplink transmissions to the base station 14.

By monitoring the SCCA flag, the mobile station 16 can determine whether the base station 14 is broadcasting new control information that will ultimately be used in place of the current control information. If the SCCA flag indicates the new control information is being broadcast, the mobile station 16 will try to decode the broadcast messages in the current and subsequent sub-frames that include the control information of interest until the new control information is successfully decoded and stored in the memory 44.

When operating in an active, or normal, mode, the mobile station 16 may operate as follows to support power saving efforts. The following operation assumes that the mobile station 16 is using the current control information, which corresponds to the current SCCC that is currently being provided by the base station 14. If the SCCA flag indicates that no new control information is being broadcast, the mobile station 16 does not need to decode the corresponding control information that is being provided by the base station 14. If the SCCA flag indicates that new control information is being broadcast AND if the mobile station 16 has previously successfully decoded the new control information that is associated with the new SCCC, the mobile station 16 does not need to decode the new control information that is being provided by the base station 14. As such, certain sub-frames or portions thereof that include the new control information need not be decoded. If the SCCA flag indicates that new control information is being broadcast AND if the mobile station 16 has not previously successfully decoded the new control information that is associated with the new SCCC, the mobile station 16 should decode the new control information that is being provided by the base station 14. Such decoding may entail decoding the BPCH to determine the presence and location of the desired control information in the system control information segment. As such, certain sub-frames or portions thereof that provide the new control information should be decoded.

When operating in a sleep or idle mode, the mobile station 16 may operate as follows to support power saving efforts. The base station 14 will periodically transmit control information. The mobile station 16 will wake up periodically, with the period set by the base station 14, to attempt to decode the current SCCC and the SCCA flag being sent in the corresponding control information. Preferably, the wake up times will coincide with the time when the SCCC and the SCCA flag is being broadcast by the base station 14.

If the mobile station 16 detects that the SCCC being broadcast is different from the SCCC for the control information that the mobile station 16 has stored, the mobile station 16 should wake up during the current sub-frame and stay awake during subsequent sub-frames to obtain the current control information that corresponds to the SCCC being broadcast by the base station 14. Such decoding may entail decoding the BPCH to determine the presence and location of the desired control information in the system control information segment. Once the current control information is obtained, the mobile station 16 will implement the current control information and either begin uplink transmissions or return to the sleep or idle mode.

Assuming that the mobile station 16 has and is using the current control information based on the SCCC being broadcast by the base station 14, the following operation may be provided to enhance power saving during sleep or idle modes. If the SCCA flag indicates that new control information is being broadcast AND if the mobile station 16 has not previously successfully decoded the new control information that are associated with the new SCCC, the mobile station 16 can awake during the current sub-frame and stay awake until it has decoded the new control information that is being provided by the base station 14. Again, such decoding may entail decoding the BPCH to determine the presence and location of the desired control information in the system control information segment. If the SCCA flag indicates that no new control information is being broadcast, the mobile station 16 does not need to decode the corresponding control information that is being provided by the base station 14 and can return to the sleep or idle mode, assuming the mobile station 16 is within a normal sleep window or paging unavailable window, without decoding the subsequent sub-frames.

From the above, control information may be categorized and delivered at different times depending on the characteristics of the control information, the operating mode of the mobile station 16, and the like. The following provides a couple of examples for allowing a mobile station 16 to gain entry to the network, and thus a particular base station 14 to initiate traffic communications. The exemplary categories described above are used. For the first example, assume that the substantially static type 1 information, which is defined as essential system-wide physical layer information for decoding downlink physical layer frames or sub-frames, is broadcast in response to an initial ranging event that is triggered by actions to initiate communications by a mobile station 16 that is in range of the base station 14. Further assume that the presence or absence of type 1, 3, and 4 control information is signaled by the BPCH and provided in the system control information segment as described above. The type 2 information may be broadcast in a fixed location every superframe.

Initially, the mobile station 16 will synchronize with the synchronization channel or preamble that is being provided by the base station 14. The mobile station 16 will decode available type 2 control information and obtain the relevant ranging region information. The ranging region information is provided as control information by the base station 14 and must be used by the mobile station 16 when performing uplink ranging procedures. Accordingly, the mobile station 16 will use the ranging region information to perform the uplink ranging procedures. The base station 14 will detect the uplink ranging attempts being made by the mobile station 16 and will transmit the type 1 control information. The mobile station 16 will decode the type 1 control information. The mobile station 16 will continue its ranging procedures, and then obtain any available type 3 and type 4 control information, which may be unicast by the base station 14 to the mobile station 16. The type 3 and type 4 control information may be transmitted on the downlink physical layer frames that are being provided to the mobile station 16.

For the second example, assume that the substantially static type 1 information is periodically broadcast to mobile stations 16 that are in range of the base station 14. Further assume that the type 1 control information is provided in a fixed resource location within a superframe and that the use of a BPCH is not necessary for the type 1 control information. The BPCH may be used for the type 3 and 4 control information. The type 2 information may be broadcast in a fixed location every superframe.

Initially, the mobile station 16 will synchronize with the synchronization channel and preamble information being provided by the base station 14. Once synchronized, the mobile station 16 will decode the type 1 information from the fixed resource locations of a particular superframe, and then decode the type 2 control information, preferably using the BPCH. If the BPCH is used, the mobile station 16 will identify the location of the type 2 control information in the system control information segment of a sub-frame based on the BPCH, and then decode the type 2 control information accordingly. The mobile station 16 may then perform any uplink ranging procedures based on the ranging information provided in the type 2 control information. Once the uplink ranging is complete, the mobile station 16 may obtain the type 3 and type 4 control information that is being unicast from the base station 14 in downlink physical layer sub-frames. Again, the type 3 and type 4 control information may be obtained through the use of the BPCH as described above.

Certain concepts of the above configurations may be employed in a multi-carrier environment. Multi-carrier environments are those that allow mobile stations 16 to simultaneously receive information that is transmitted on two or more different carriers. For example, a 10 MHz spectrum can be divided into two 5 MHz carriers in order to simultaneously support mobile stations 16 with 5 MHz bandwidth capability, as well as those with 10 MHz bandwidth capability. Mobile stations 16 that have a multi-carrier mode are able to receive information simultaneously on both the 5 MHz carrier and the 10 MHz carrier. Not all of the carriers need to redundantly carry control information. For example, system-wide and sector-wide system information is common to all carriers. As such, there is no need to transmit the base station ID on all carriers, as the base station ID will stay the same regardless of the carrier or carriers being used. Repeating the control information over multiple carriers merely increases overhead.

Accordingly, at least two carrier types may be defined: a primary carrier and a secondary carrier. A primary carrier may carry the synchronization channel (or preamble), all of the system information, neighboring base station information, paging information, and resource allocation and control information, which generally correspond to all of the categories of control information described above. As such, the primary carrier may be used to carry type 1 through type 7 control information. The secondary carrier may only carry a subset of the system information, such as the type 2 control information, which is related to superframe configuration on the secondary carrier, as well as the resource allocation and control information of each sub-frame within that carrier, such as the type 7 information. This type of carrier may also carry the synchronization channel (or preamble) information. Regardless of the configuration, the different primary and secondary carriers need not carry the same control information.

In general, one or more carriers within the spectrum can be designated as primary carriers, while one or more carriers within the spectrum may be designated as secondary carriers. Mobile stations 16 that only have the capability to transmit and receive on a single carrier at a time are assigned to the primary carrier. Wideband mobile stations 16 that are capable of transmitting and receiving on multiple carriers at a time are assigned to one or more primary carriers as well as one or more secondary carriers. Based on the allocations described above, the base stations 14 may provide system broadcast information, such as type 1 through type 6 control information and resource allocation and control information, such as the type 7 control information, over the primary carriers. Superframe configuration information, such as the type 2 control information, may be transmitted at a superframe boundary over the secondary carriers. Accordingly, the wideband mobile stations 16 will monitor the assigned primary carriers for the system control information, as well as the resource allocation and control information, and monitor the secondary carriers for the superframe configuration.

Channel information, such as channel quality information (CQI) of one or multiple carriers may be fed back over either one of the carriers, depending on how the base station 14 has instructed the mobile station 16. When configured to feed back the CQI of a secondary carrier, the mobile station 16 has to measure the channel qualities associated with the respective carriers. For example, the CQI of the primary carrier should be quantified based on the preamble or pilot symbols received via the primary carrier, whereas the CQI of the secondary carrier should be measured based on the preamble or pilot symbols received via the secondary carrier.

Appendix A: 802.16M Control Framework

Problem

The application proposes the different aspects of control signaling mechanism between BS and MS to support system operation including system configuration, resource allocation/control, paging, MS network entry, power saving modes, multi-carrier operation. The proposed scheme allows reduced control overhead, enables power saving reduces MS processing requirements and enables MS fast network entry. What Solutions have been Tried and why they Didn't Work Here is a list of current solutions and the issues:

(1) In existing systems such as WiMAX and UMB, some static system information are periodically broadcast even though MSs already entered the network do not need to read these information again.

(2) The concept of a Guide Channel is known and has similar function as the BPCH we propose here, i.e. a channel that indicates the presence of certain types of control information in a frame. However, the known Guide Channel is present in every frame whereas in this application we propose methods to allow BPCH to be present only when necessary, to reduce overhead.

(3) The concept of primary and secondary carriers are known.

However, the detailed mapping for what control information is carried on primary and secondary carriers are not given. In this application, we categorize different types of control information and propose how to map them to primary and secondary carriers. Load balancing scheme across multiple carriers are known. These do not provide solution related to control signaling. A common layer 2/3 protocol is known that anchors multiple carriers. The common layer 2/3 protocol performs resource management and other system management for all the carriers. No details control signaling scheme was proposed, which this application addresses.

(4) Existing systems such as WiMAX and UMB do not have an efficient and power saving way for MS in different power saving modes to track whether it has the up to date system information.

Specific Elements or Steps that Solved the Problem and how they do it

To reduce the broadcast control signaling overhead, we propose the BS to transmit static system-wide information, only when the BS detects that there is MS attempting to enter the network. There are two general types of static system wide information. One is essential physical layer configuration information that is needed for initial system access. Second is MAC/upper layer information that is not needed for initial system access. For the former, the BS has to broadcast the information once it detects that there is one or more MSs attempting network entry. For the latter, the BS unicasts the information the MS after the MS has performed initial system access.

In order for the BS to detect if there is one or more MSs attempting to enter the network, the BS broadcast the uplink ranging (or random access) information periodically so that MS attempting network entry can decode such information and use it for transmitting uplink ranging (random access).

Since different types of control signaling, e.g. system configuration broadcast paging, resource allocation/control, should be sent at different periodicity and some are event driven (e.g. paging information does not have to be sent if there is no MS to page), we propose to signal the presence of a particular type of control information using a Broadcast Pointer Channel (BPCH). An MS only needs to decode the BPCH to find out if it needs to decode subsequent control channels. This enable power saving. To further reduce overhead BPCH may not be present in every frame. We propose two options for MS to detect whether BPCH is present or not. One option is MS performs blind detection on the presence of BPCH. Second option is the presence of BPCH is indicated by a flag in the multicast control segment (MCCS), where MCCS is a segment that is already present in every frame for the purpose of resource allocation/control.

As it is critical for MS to receive system configuration information sent by the BS, we propose schemes to enable MS to track whether it has the most up to date system configuration information sent by the BS. The schemes proposed also enable power saving of MS in normal mode, sleep mode and idle mode.

We propose the overall MS network entry procedure based on the components listed above.

For the case of multi-carrier deployment a wideband MS can be instructed by the BS to monitor a subset of the carriers for control information, for power saving purpose, reduce processing requirements, as well as reduce system control signaling overhead. We propose primary and secondary carriers which carry different types of control Information.

Introduction

This contribution presents the types of control information required for 802.16m system operation including system access, transmission/reception of traffic packets, handover etc.

Different types of control information has different characteristics in terms of the frequency of change, broadcast or unicast, robustness requirement, importance to initial system access, etc. Therefore, different types of control information should be treated differently.

This contribution presents how each type of control information should be transmitted by the BS and received by the MS. A description of the MS network entry procedure as well as sleep mode operation are provided in terms of how the MS obtains the necessary control Information for proper operation. The support of multi-carrier operation is also described in terms of how MS monitors each carrier for the necessary control information.

Control Information in Legacy 16e System

In 16e, scheduling control information is sent in MAPs, while system information is sent in DCD/UCD. In addition, neighbor BS information and paging information are sent on broadcast MAC messages.

Some of the information sent on MAPs are not necessary dynamic and therefore can be sent in less frequent manner to reduce overhead. E.g., STC zone switch IE, ranging region definition, fast feedback region definition.

Some of the information in DCD/UCD are static system information, thus does not need to be periodically broadcast to MSs that have already entered the network or broadcast with a relatively long period to improve reliability. E.g., BS ID, operator ID, subnet ID, TDD ratio.

Some of the information in DCD/UCD are semi-static system configuration information, thus does not need to be periodically broadcast to MSs that have already entered the network if the configuration hasn't been changed or broadcast with a relatively long period to improve reliability. E.g., burst profile, handover parameters.

Similarly, neighbor BS information which is semi-static information does not need to be periodically broadcast to MSs that have already entered the network if the configuration hasn't been changed.

FIGS. 6-8 present a table describing seven types of downlink (DL) control information.

Broadcast Pointer Channel (BPCH)

The broadcast of Information types (1), (3), (4), (5), (6) may or may not be present in a sub-frame or superframe boundary. To efficiently indicate the presence/absence of these information block, a 16m Broadcast Pointer Channel (BPCH) is introduced.

The 16m BPCH contains the following: information blocks presence flags; and length of each information block that is present.

Examples of information blocks are:
System information types (1), (3) (4) and (5). In this information block, multiple MAC management messages for the different information types can be encapsulated.
Paging information (type (6)) (either quick paging or full paging information).

The benefit of 16m BPCH is to allow sleep mode and idle mode MS to only decode the 16m BPCH to find out if broadcast information is present and whether the broadcast information present is relevant or not (e.g. paging information is not relevant to sleep mode MS).

If the broadcast information is not present or the broadcast information not relevant, the MS can go back to sleep without the need to decode the rest of the sub-frame and the resource allocation/control information, i.e. type (7).

If the broadcast information is present and relevant, the MS just needs to decode the relevant broadcast information and go back to sleep without the need to decode the rest of the sub-frame and the resource allocation/control information, i.e. type (7).

BPCH may or may not be present in each sub-frame. There are two options of how the presence of BPCH can be detected.

Option 1: A 'BPCH present' flag is added to the multicast control segment (MCCS) to indicate the presence/absence of the BPCH, e.g., as illustrated in FIG. 9. Note that MCCS contains control information to indicate the partitioning of resource within a frame for traffic bursts. MCCS is of fixed length and modulation/coding (refer to contribution NNN for details).

An MS first decodes the MCCS. If the 'BPCH present' flag is set to '1' (i.e. BPCH is present) the MS will decode the BPCH. The length and modulation/coding of BPCH is fixed. The information contained in BPCH will allow the MS to decode the system broadcast information that follows. The remaining resource in the sub-frame is for traffic burst and the partitioning of those resource is signaled by the MCCS.

If the 'BPCH present' flag is set to '0' (i.e. BPCH is not present), the MS will know that both BPCH and system broadcast information are not present. The remaining resource in the sub-frame is for traffic bursts, and the partitioning of those resource is signaled by the MCCS.

Option 2: If present, BPCH is located at fixed location in a sub-frame, e.g., as shown in FIG. 10. It has fixed length and modulation/coding. MS performs blind detection to decide if BPCH is present or not.

An MS first attempts to decode BPCH. If decoding successful, the information contained in BPCH will allow the MS to decode the system broadcast information that follows. The remaining resource in the sub-frame contains the MCCS and resource for traffic bursts. The partitioning of the resource for traffic burst is signaled by the MCCS. Note that MCCS is of fixed length and modulation/coding.

If MS does not successfully decode the BPCH, the MS will assume that both BPCH and the system broadcast information are not present. The MS proceeds to decode the MCCS and the rest of traffic burst if applicable.

Transmission of System Configuration Information (Type 4)

As this type of information is semi-static and can change, the BS has to inform the MS in a timely manner when the information changes while enabling power saving of MS.

Here is the proposed approach:

(A) A 'system configuration change count (SCCC)' is included in the system configuration broadcast messages sent from the BS. It is used to indicate the version number of the associated system configuration information. An action timer is included in the system configuration-broadcast messages to indicate when the associated system configuration takes effect.

(B) Overall, an MS stores up to two sets of SCCC values and corresponding system configuration information in its memory. One is the SCCC value and corresponding system configuration information currently in effect. The other is the SCCC value and corresponding system configuration information that will take effect at a specific action time.

(C) BS transmits a SCCC and a 'system configuration change alert (SCCA)' flag periodically in a frequent manner. For example, every superframe as part of the superframe configuration control information, i.e. type (2). The SCCC is used to indicate the version number of the system configuration information currently in effect. The SCCA flag is used to indicate if BS has broadcast new system configuration information than those associated with the current SCCC.

(D) By detecting the SCCC value, the MS knows the current version of the system configuration information in effect and therefore can configure itself accordingly if the MS has previously received the corresponding system configuration broadcast messages. By detecting the SCCA flag, the MS knows if BS has broadcast new system configuration information. If the flag is set to '1', the MS will try to decode the system configuration broadcast messages in current and subsequent subframes until it has successfully decoded the information.

(E) If MS has detected an SCCC value from the BS that is different from the

SCCC value(s) the MS has stored, the MS shall cease UL transmission and attempt to decode system configuration broadcast messages from the BS in the downlink. The MS shall only resume UL transmission after it has successfully decoded the system configuration broadcast messages that contain the SCCC value.

(F) To support power saving for MS in normal/active mode:

If MS has detected that SCCC value has not changed and SCCA flag is set to '0', the MS does not need to decode the system configuration broadcast messages indicated in the BPCH.

If MS has detected that SCCC value has not changed and SCCA flag is set to '1' and if the MS has previously successfully decoded the system configuration broadcast messages with new SCCC value, the MS does not need to decode the system configuration broadcast messages indicated by the BPCH.

If MS has detected that SCCC value has not changed and SCCA flag is set to '1' and if the MS has not previously successfully decoded the system configuration broadcast messages with new SCCC value, the MS has to decode the system configuration broadcast messages indicated by the BPCH.

(G) To support power saving for MS in sleep mode or idle mode:

BS periodically transmit the system broadcast information.

MS in sleep mode or idle mode wakes up periodically (with period configured by the BS) to attempt to decode the SCCC/SCCA sent in the superframe configuration control information. The wake-up time of the MS should coincide with the time when the SCCC and SCCA is broadcast by the BS.

If the MS detects that SCCC has changed and the value is not the same as what it stores in the memory, the MS shall be awake in this subframe and subsequent sub-frames to decode BPCH and the system broadcast information until it has successfully decode system configuration broadcast messages from the BS that contains the SCCC value.

If the MS detects that SCCC has not changed but SCCA flag is set to '1' and the MS has not previously received system configuration broadcast messages from BS that contains a new SCCC value, the MS shall be awake in this subframe and subsequent sub-frames to decode BPCH and the system broadcast information until it has successfully decode system configuration broadcast messages from the BS that contains a new SCCC value.

If the MS detects that SCCC has not changed and SCCA flag is set to '0', the MS can go back to sleep (if it is in sleep window or paging unavailable interval) without the need to decode the subsequent sub-frames Initial Network Entry Procedure at MS There are two methods for MS network entry procedures which correspond to the two options for the type (1) shown in FIG. 6.

Method 1 based on option (1a) of type (1) information:
Step 1: MS synchronizes with sync channel/preamble.
Step 2: MS decodes information type (1).
Step 3: MS decodes information type (2).
Step 4: MS performs UL ranging procedure based on the ranging region information given in information type (2).
Step 5: MS obtains type (3) and type (4) information through unicast signaling from the BS, transmitted on DL PHY sub-frames.

Method 2 based on option (1b) of type (1) information:
Step 1: MS synchronizes with sync channel/preamble.

Step 2: MS decodes information type (2) and obtain the ranging region information.

Step 3: MS performs UL ranging procedure based on the ranging region information given in information type (2).

Step 4: BS detects the MS ranging attempt, and BS transmits the information type (1). MS decodes the information type (1).

Step 5: MS continues the ranging procedure.

Step 6: MS obtains type (3) and type (4) information through unicast signaling from the BS, transmitted on the DL PHY frames.

Multi-Carrier Support

In the case of contiguous spectrum, multi-carrier mode is used to support MSs with different bandwidth capability. For example, a 10 MHz spectrum can be divided into two 5 MHz carriers in order to simultaneously support MSs with 5 MHz bandwidth capability and 10M Hz bandwidth capability.

Not all the carriers need to carry all the system broadcast information, as system-wide and sector-wide system Information are common to all carriers. Repeating the information over multiple carriers increase the overhead.

Two types of carriers can be defined.

(A) Primary carrier: this is a carrier that carries the synchronization channel (or preamble), all the system information, neighbor BS information, paging information and resource allocation/control information, i.e., information-type (1) to type (7) described in FIGS. 6-8.

(B) Secondary carrier: this is a carrier that carries a subset of the system information, i.e., information type (2) for information related to superframe configuration on that carrier; as well as the resource allocation/control information of each sub-frame within the carrier, i.e. type (7). This type of carrier may also carry the synchronization channel (or preamble).

One or multiple carriers within the spectrum can be designated as primary carriers. One or multiple carriers within the spectrum can be designated as secondary carriers.

A narrowband MS, i.e. an MS that has bandwidth capability to transmit/receive on only one carrier at a time, is assigned to a primary carrier.

A wideband MS, i.e., an MS that has bandwidth capability to transmit/receive on multiple carriers at a time, is assigned to one or multiple primary carriers.

A wideband MS monitors only the assigned primary carrier(s) for system broadcast information, i.e. type (1) to type (6), and resource allocation/control information, i.e. type (7), for new traffic packet transmission. The wideband MS also monitors secondary carrier(s) for superframe configuration broadcast information, i.e. type (2) at the superframe boundary. The MS may monitor the resource allocation/control information, i.e. type (7), on secondary carrier(s) for HARQ retransmissions. Details of HARQ ACK/NAK and retransmission for multi-carrier operation is given in other appendices.

A wideband MS may be configured by the BS to feedback the channel quality information (CQI) of one or multiple carriers. When configured to feedback the CQI of a secondary carrier, the MS has to measure the channel on the corresponding carrier through either the preamble or pilot signals sent on that carrier.

Key Techniques

Method for BS to determine when to transmit the static system wide information for MS entering the network in an event-triggered manner.

Method for BS to transmit information related to uplink initial random access or initial ranging resource to MS prior to MS entering the network.

Method for BS to indicate the presence/absence of certain system broadcast information.

Method for BS and MS to synchronize on the system configuration information

Method for MS to perform initial network entry.

Method to send various types of control information over multiple carriers.

Appendix B: Proposal for IEEE 802.16M Resource Allocation and Control

Document Number: IEEE C802.16m-08/176.

Date Submitted: 2008-03-10.

Source: Sophie Vrzic, Mo-Han Fong, Robert Novak, Jun Yuan, Dongsheng Yu, Anna Tee, Sang-Youb Kim, Kathiravetpillai Sivanesan.

Nortel Networks.

Re: IEEE C802.16m-08/005—Call for Contributions on Project 802.16m System Description Document (SDD), on the topic of "Downlink Control Structure".

Purpose: Adopt the proposal into the IEEE 802.16m System Description Document.

Scope

This contribution presents the IEEE 802.16m resource allocation and control design for single band operation.

The resource allocation and control design for multi-band operation is presented in a separate section. (0802.16m-08_178 also included in other appendices).

Background

The legacy 16e system uses a two dimensional approach to assign resources to users. This requires a lot of overhead in signaling the assigned resources.

Other systems such as LTE and UMB use a one dimensional approach based on a channel tree to reduce the resource assignment signaling overhead.

Each assigned user is allocated resources by assigning a node from the tree.

Although a channel tree can save in signaling overhead, there are some restrictions in the number of base nodes that can be assigned.

For example, if a binary tree is used then only 2, 4, 8, 16, etc. nodes can be assigned. Also, if more granularity is added to the tree the total number of nodes increases, which increases the number of bits that are required to signal each assignment.

The legacy 16e system is also inefficient in power since it relies on broadcasting and/or multicasting assignment information.

Both UMB and LTE systems have lower power overhead since the assignment information is transmitted using separate unicast messages, which are power controlled to the each user individually.

The legacy 16e system uses a TDM approach for multiplexing control and data within a subframe.

Since the assignment information is located in the same region of the sub-frame in all sectors and since the information is a multicast message, no power boosting can be applied.

FIG. 11 is a table showing Pros and Cons associated with one dimensional (with a channelization tree) and two dimensional resource allocation.

FIG. 12 is a table showing Pros and Cons associated with multicast control and unicast control.

FIG. 13 is a table showing Pros and Cons associated with TDM versus FDM of control and data.

Requirements from SRD

System Overhead:

Overhead, including overhead for control signaling as well as overhead related to bearer data transfer, for all applications shall be reduced as far as feasible without compromising overall performance and ensuring proper support of systems features.

Motivation

In order to improve the overhead of the control channel of the legacy system and make it better than existing systems such as UMB, LTE, a new control channel design is proposed for IEEE 802.16m sub-frames.

The control and traffic channels are confined within each sub-frame and span across all the symbols within the sub-frame.

Extended sub-frames can be defined to concatenate the sub-channel resource across multiple sub-frames to reduce control overhead and improve UL coverage. This is for FFS.

The control channel consists of a short multicast message and separate unicast messages for each assignment.

Multicast message is kept very small since it is power controlled to the lowest geometry user that is assigned in the given sub-frame.

Each unicast message is power controlled to the intended user.

Group assignments messages are used for VoIP. The contents of the group assignment message is described in another section. (C80216m-08_177 also included in other appendices).

The multicast message is a 10 bit message that is used to indicate how the available resources are partitioned. The partitions are not associated with any channelization tree so there is no restriction to the number of resources that can be assigned to a mobile.

The multicast message also removes the need of signaling a node ID for each assignment. This leads to a significant reduction in overhead since most channelization trees use 9-11 bits for signaling a node ID. The reduction in overhead increases as the number of assignments increases.

Overview of Control Channel Framework

The bandwidth can be divided into one or more zones, which can be either diversity zones or localized zones. Each zone consists of an integer number of Basic Channel Units (BCUs) (see contribution C80216m-08_175 also included in other appendices).

Separate control channels are defined within each zone to assign resources within the zone.

The multicast control segment plus other DL control channels (e.g. HARQ ACKs, power control bits) consist of an integer multiple of BCUs.

A diversity zone can contain a persistent sub-zone and a non-persistent sub-zone. A localized zone contains only the non-persistent sub-zone.

The multicast control segment indicates how the available resources are partitioned.

This includes unused resources in the persistent sub-zone as well as the non-persistent sub-zone.

The multicast control segment for a diversity zone consists of a combination index (CI) and if persistent resources are allocated it consists of a resource availability bitmap (RAB) (see VoIP contribution C80216m-08_177 also included in other appendices).

For a localized zone, the multicast control segment consists of a permutation index (PI).

The multicast control segment is power controlled to the lowest geometry user that is assigned within the sub-frame.

The multicast control segment sent in a diversity zone along with other multicast and broadcast channels.

Figure 14:
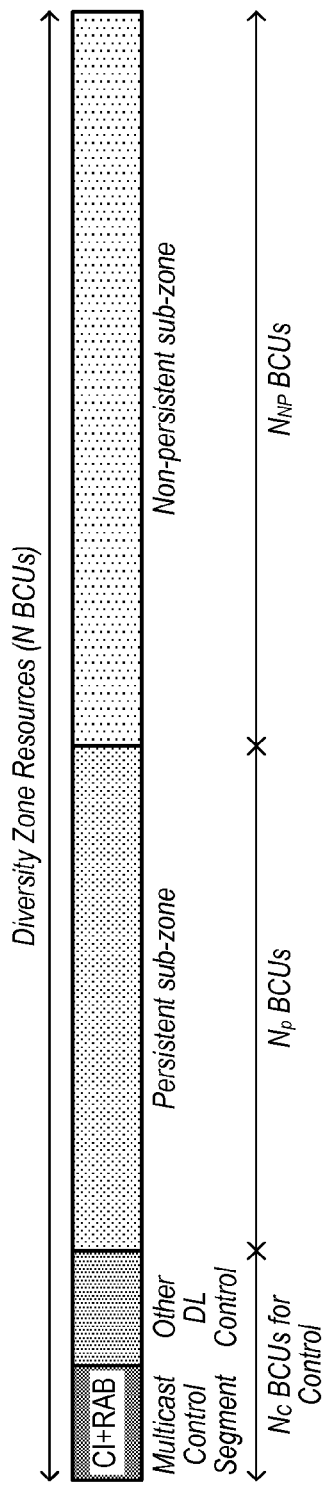
FIGS. 14 and 15 present an overview of a control channel framework.
Figure 15:
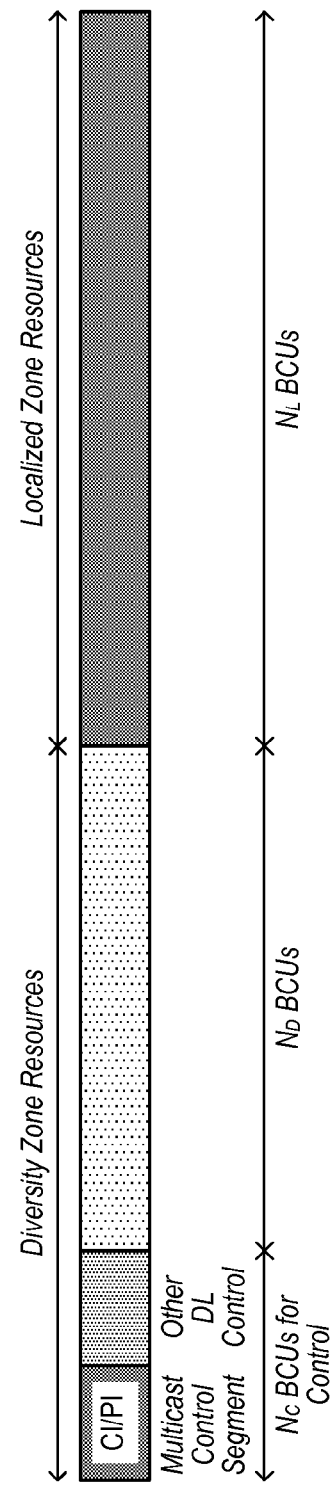

FIGS. 14 and 15 present an overview of a control channel framework.

Content of Multicast Control Segment for a Diversity Zone

The multicast control segment consists of a 10 bit combination index.

The index is an index to a look-up table that consists of all possible combinations of an ordered list of k partitions of size $n_1, n_2, \ldots, n_k$, where $\Sigma n_i = N$, $i=1, 2, \ldots, k$. The partitions in each list are ordered in increasing size.

In order to reduce the size of the combination index, a fixed maximum number of assignments is assumed. The maximum number of assignments depends on the number of available resources. If more assignments are needed then a second combination index is used to further partition the resources.

FIG. 16 is a table showing the number of partitions and the partitioning of 10 available resources for each value of the combination index.

Combination Index Look-Up Table

The combination index look-up table depends on the number of resources available.

The table below shows the number of users that can be assigned with one combination index (10 bits) for a given number of available resources.

For bandwidths that contain more than 24 BCU, multiple combination indices are used.

FIG. 17 is a table showing number of available resources versus maximum number of assignments using a 10 bit CI.

Example Using the Combination Index

For example, if there are a total of 24 BCU s and 4 mobiles are scheduled as follows:

MS 1: 6 units;
MS 2: 4 units;
MS 3: 10 units;
MS 4: 4 units.

The combination index corresponding to CI(4,4,6,10) is signaled on the multicast control channel.

The maximum number of assignments with one combination index of 10 bits is 8. If more than 8 assignments are needed then another combination index is used to partition the last partition in the previous combination index.

For example, to assign 9 users with a combination index corresponding to CI(1,1,1,2,2,3,4,4,6), two combination indices can be used.

The first combination index corresponds to 8 partitions of 24 available resources $CI_{24}(1,1,1,2,2,3,4,10)$.

The second combination index, which partitions the last partition in the previous CI (10 resource units), corresponds to $CI_{10}(4,6)$.

Content of Multicast Control Segment for a Localized Zone

For localized channel assignments a permutation index (PI) can be used instead of a combination index to indicate the sub-bands assigned to different users.

The permutation index represents the number of contiguous sub-bands that are assigned to each user. Non-contiguous sub-bands can be assigned to a mobile with separate assignment messages.

The mobiles are assigned in order of their assigned sub-bands.

If the number of assignments is k and the total number of sub-bands is $N_8$ then permutation Index represents a vector $(n_1, n2, \ldots, n_k)$, where $\Sigma n_i = N_8$ and $n_i > 0$, $i=1, 2, \ldots, k$.

For example, if the permutation index represents the vector $(n_1, n_2, n_3)$ then the first mobile is assigned the first $n_1$ sub-bands, the second mobile is assigned the next $n_2$ sub-bands and the third mobile is assigned the next $n_3$ sub-bands.

If the number of sub-bands is 8 and the maximum number of assignments is 8 then the number of permutations is 128 (7 bits).

In general, if there are N sub-bands with up to N assignments then the number of permutations is $2^{N-1}$ and therefore N−1 bits are required for the permutation index.

Example Using the Permutation Index

The table in FIG. 18 shows an example of a permutation index look-up table for the case where there are 4 sub-bands.

In this case, there are a total of 8 permutations and only 3 bits are required to signal the PI.

Non-Persistent Resource Assignment within a Diversity Zone

The ordered list of available resources within persistent and non-persistent sub-zones are divided into several segments.

The segments are ordered in increasing partition size.
The different types of segments include:
An UL control segment;
DL Unicast control and traffic segment;
DL Retransmission control and traffic segment in the case resource adaptive synchronous HARQ is used (for asynchronous, this segment is not present since asynchronous HARQ retransmission can be assigned by the unicast control and traffic segment);
DL Group control and traffic segment.

Figure 19:
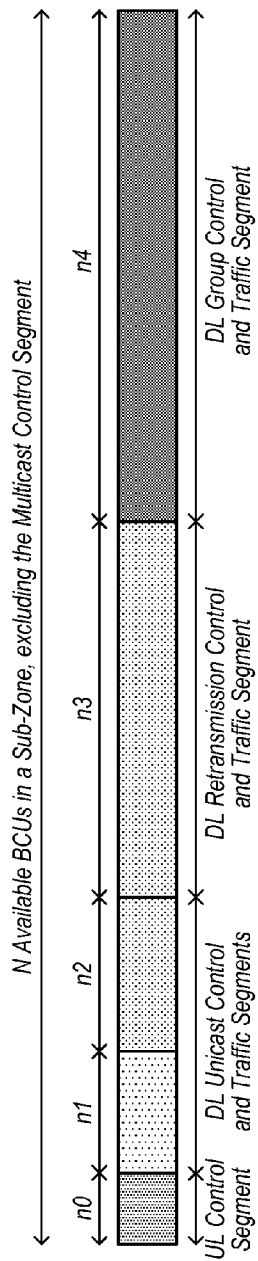
FIG. 19 shows a diagram that is signaled with a combination index that indicates how the N resources are divided into 5 partitions of lengths $n_0$, $n_1$, $n_2$, $n_3$, $n_4$.

The diagram in FIG. 19 is signaled with a combination index that indicates how the N resources are divided into 5 partitions of lengths $n_0, n_1, n_2, n_3, n_4$.

Unicast Control and Traffic Segment

The unicast control and traffic segment consists of one unicast assignment. There can be multiple unicast control and traffic segments.

The unicast message is scrambled by the user ID of the intended user.

The length of the message depends on the type of assignment. There are a limited number of message lengths (e.g. 2). The mobiles use blind detection to decode the message.

Each unicast message is followed by the data for the intended user.

The length of the unicast message can be a fraction of a BCU.

Figure 20:
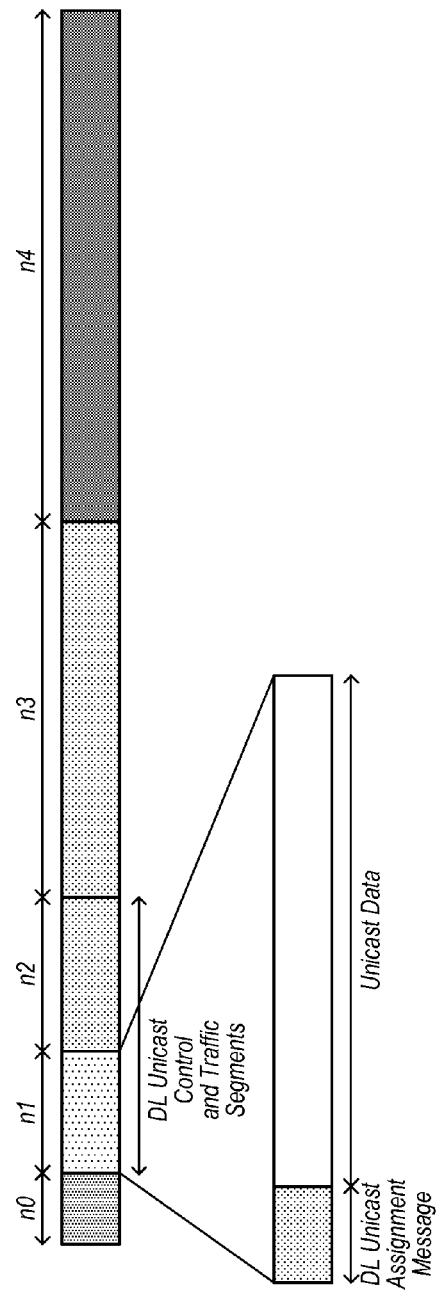
FIG. 20 shows an example of a downlink control and traffic segment.

FIG. 20 shows an example of a downlink control and traffic segment.

Group Control and Traffic Segment

The group control and traffic segment is used for real time traffic such as VoIP. There can be multiple group assignment segments (see VoIP contribution C80216m-08_177 for details also included in other appendices).

The control channel for the group assignment segment is a multicast assignment message and is located within the resources allocated for the group assignment segment.

To identify the group assignment segment, the group assignment message is scrambled by the group ID.

The message length is known to all the mobiles in the group.

Figure 21:
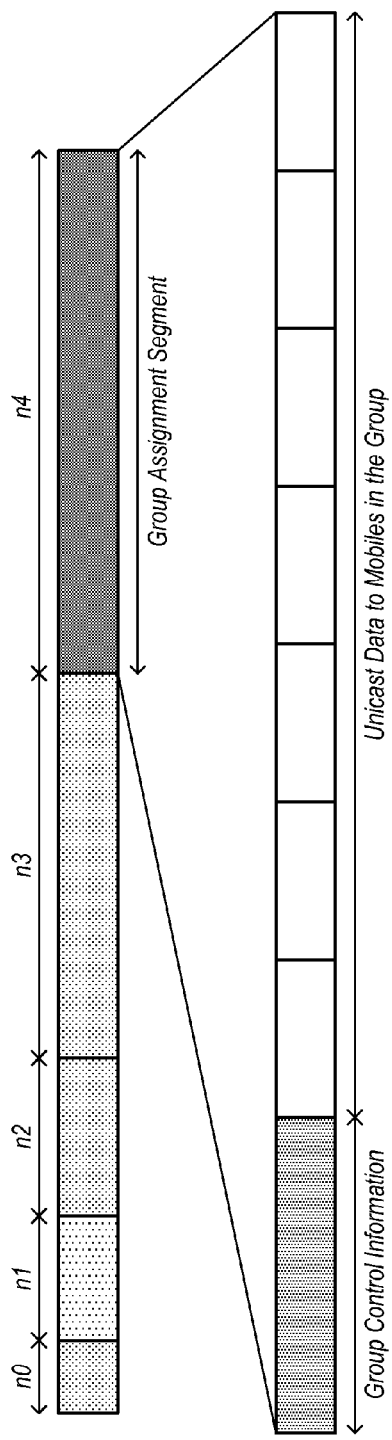
FIG. 21 shows an example of a group assignment segment.

FIG. 21 shows an example of a group assignment segment.

UL Control Segment

Multiple users are assigned resources using an UL CI. This is then followed by unicast assignment information for each user.

The unicast information is a fixed length and is decoded by each user sequentially until the mobile finds its UL unicast assignment message.

The unicast information contains the assigned MCS and it is scrambled by the user ID of the intended user.

The group UL assignment messages are signaled after the unicast UL assignments. The group assignment message length is an integer multiple of the unicast message and it is scrambled by the group ID (see VoIP contribution C80216m-08_177 also in other appendices).

Figure 22:
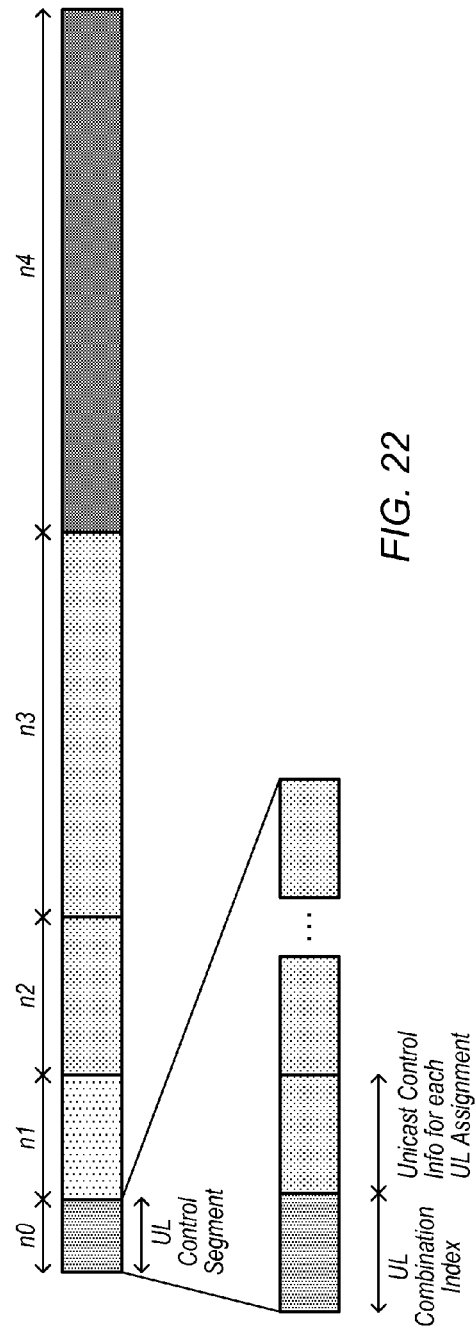
FIG. 22 shows an example of an uplink control segment.

FIG. 22 shows an example of an uplink control segment.

Retransmission Segment

The retransmission segment is only required when resource adaptive synchronous HARQ is used.

In resource adaptive synchronous HARQ, the retransmissions occur at a pre-determined time and at the same MCS as the original transmission.

Only the resource location is adapted.

The retransmission segment is partitioned using a combination index, which is signaled at the beginning of the retransmission segment.

The retransmission combination index is scrambled by a unique code that identifies the retransmission segment.

The retransmission CI is then followed by a unicast message for each retransmission. The unicast message consists of the resource ID of the transmission on the previous interlace.

Figure 23:
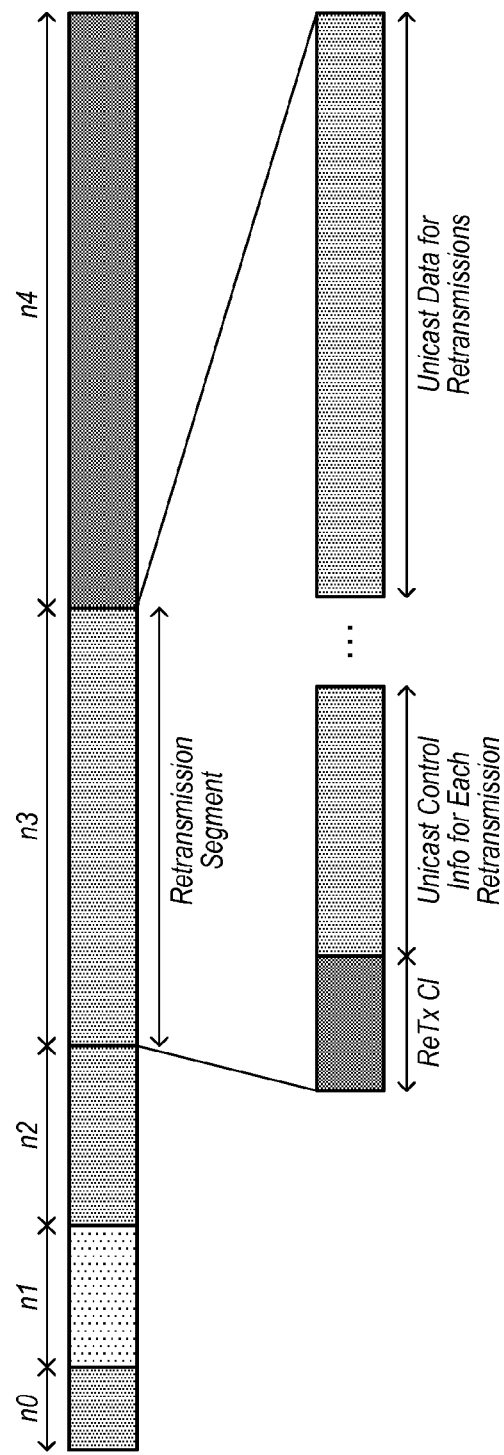
FIG. 23 shows an example of a retransmission segment.

FIG. 23 shows an example of a retransmission segment.

Persistent Resource Assignment

Persistent resource assignment can be used for low geometry users for traffic such as VoIP.

Persistent sub-zone allows multiplexing of persistent resource and non-persistent assignments through the RAB.

Details of the persistent sub-zone and RAB are given in the VoIP contribution C80216m-08_177.

Resource Allocation within a Localized Zone

A localized zone can use either dedicated pilots or common pilots (see contribution C80216m-08_172 included in other appendices). Dedicated pilots can be used when preceding is performed.

In both cases, a PI is used to indicate how the sub-bands are allocated to different users.

The multicast control segment containing the PI is sent in a diversity zone. Other multicast and broadcast messages that require frequency diversity are sent on the diversity zone.

The user specific resource assignment is signaled within the resources allocated to the user.

This improves the control channel robustness, since the control channel will be located in the mobile's best sub-band.

In the case where dedicated pilots are used for beamforming, the control channel is also preceded using the same preferred preceding vector as for the data, which further improves the control channel.

The MCS and power allocated for the control can be different than the data.

Control Channel Overhead Comparison

The overhead for the proposed control channel is compared with the WiMAX reference system and with UMB for two cases.

Case 1: Simple non-MIMO assignments (e.g. STTD R1/R2).

Case 2: Single user MCW MIMO assignment with 4 layers.

Only overhead due to resource allocation is included. Other control overhead such as DL ACK channel and power control channel are not included in the overhead calculations.

Assumptions for WiMAX reference system overhead calculations:

FCH is modeled.

The map is transmitted using QPSK 1/2, with repetition=6. Three sub-maps are transmitted using QPSK 1/2 with repetition=4, 2, and 1.

The user distributions for the MAP and the 3 sub-maps is 0.07, 0.20, 28, 0.45, respectively.

Assumptions for UMB overhead calculations:

The unicast messages in the F-SCCH are 39 bits long (including CRC).

One F-SCCH message is needed for each assignment in case 1.

Two F-SCCH messages are needed for each assignment in case 2.

The F-SCCH is transmitted using QPSK 1/3.

Control Channel Overhead Comparison

Assumptions for Nortel overhead calculations:

The multicast control segment consists of a 10 bit combination index and a CRC of 6 bits.

The non-MIMO assignments in case 1 are 22 bits including CRC.

The MIMO assignments in case 2 are 38 bits including CRC.

The Multicast control segment is transmitted using QPSK 1/3 with repetition=2 and the unicast messages are transmitted using QPSK 1/3

There are 24 BCUs in a 10 MHz. One BCU is used to transmit the CI and DL ACK channel and other DL control channels. There are 23 available BCUs for DL assignments.

Control Channel Overhead Comparison

FIGS. 24 and 25 are Tables for control channel overhead comparison.

Comparison of Blind Decoding Complexity

In LTE, the number of blind decoding attempts as provided in contribution R1-081101:

For common search space is ~10;

For UE specific search space is ~30;

The total is ~40 blind decoding attempts every TTI, which is equivalent to 2 Mbps.

The number of blind decoding attempts in the Nortel proposal:

Up to 2 attempts for different unicast message types per partition;

Since the expected number of partitions <10, the total number of blind decoding attempts <20<LTE.

SUMMARY

In summary, the proposed control channel design shows a significant improvement in control overhead over both the WiMAX reference system as well as UMB.

The new design minimizes both power and bandwidth overhead.

The lower overhead is attributed to following.

(A) Using a combination index rather than a channelization tree.

More flexibility (no restrictions in the number of resources that can be assigned).

Lower overhead since the node ID does not have to be signaled in each assignment.

(B) Taking advantage of multicast control and unicast control.

Multicast control is used to signal common information that is needed by all the assigned users.

Unicast control is used to signal user specific information.

(C) By combining the unicast control with the data, the resource granularity for the control is lower.

For unicast control, the granularity is to the unit of a single tone.

For group control, the granularity is to the unit of RBs.

This new design also allows for micro-sleep to be enabled by ordering the tones in frequency first and then assigning tones to the control channel at the beginning of the allocated resources.

Appendix C: Proposal for IEEE 802.16M DL Resource Blocks and Channelization

Document Number: IEEE C802.16m-08/175.

Date Submitted: 2008-03-10.

Source: Sophie Vrzic, Mo-Han Pong, Robert Novak, Jun Yuan,

Dongsheng Yu, Anna Tee, Sang-Youb Kim, Kathiravetpillai Sivanesan.

Nortel Networks.

Re: IEEE 802.16m-08/005—Call for Contributions on Project 802.16m System Description Document (SDD), on the topic of "Downlink Physical Resource Allocation Unit (Resource Blocks and Symbol Structure)".

Purpose: Adopt the proposal into the IEEE 802.16m System Description Document.

Scope

This contribution proposes a new resource block structure and channelization for IEEE 802.16m.

The pilot design and resource allocation and control are presented in separate contributions (see C802.16m-08_172 and C802.16m-08_176 also included in other appendices).

Motivation

The legacy 16e system uses a TDM approach to configuring diversity, localized and MIMO zones.

In an FDM approach, the channelization can span across all symbols in a sub-frame. Different zones are configured to use a different portion of the band. Spanning the channelization across all symbols allows for efficient power control of both control and traffic.

Overview of Channelization Design

New channelization and control channel design are defined for IEEE 802.16m sub-frames.

The channelization for control and traffic is confined within each sub-frame and span across all the symbols within the sub-frame.

Extended sub-frames can be defined to concatenate the sub-channel resources across multiple sub-frames to reduce control overhead and improve UL coverage. This is for FFS.

Within a 16m sub-frame, the bandwidth is divided into one or more zones. Each zone consists of a set of physical tones. The set of physical tones that belong to a zone may be either contiguous or non-contiguous.

The zones are used for:

Diversity channel assignments;

Frequency selective scheduling (localized zone);

Fractional frequency reuse (FFR);

Single Frequency Network (SFN) transmission.

Figure 26:
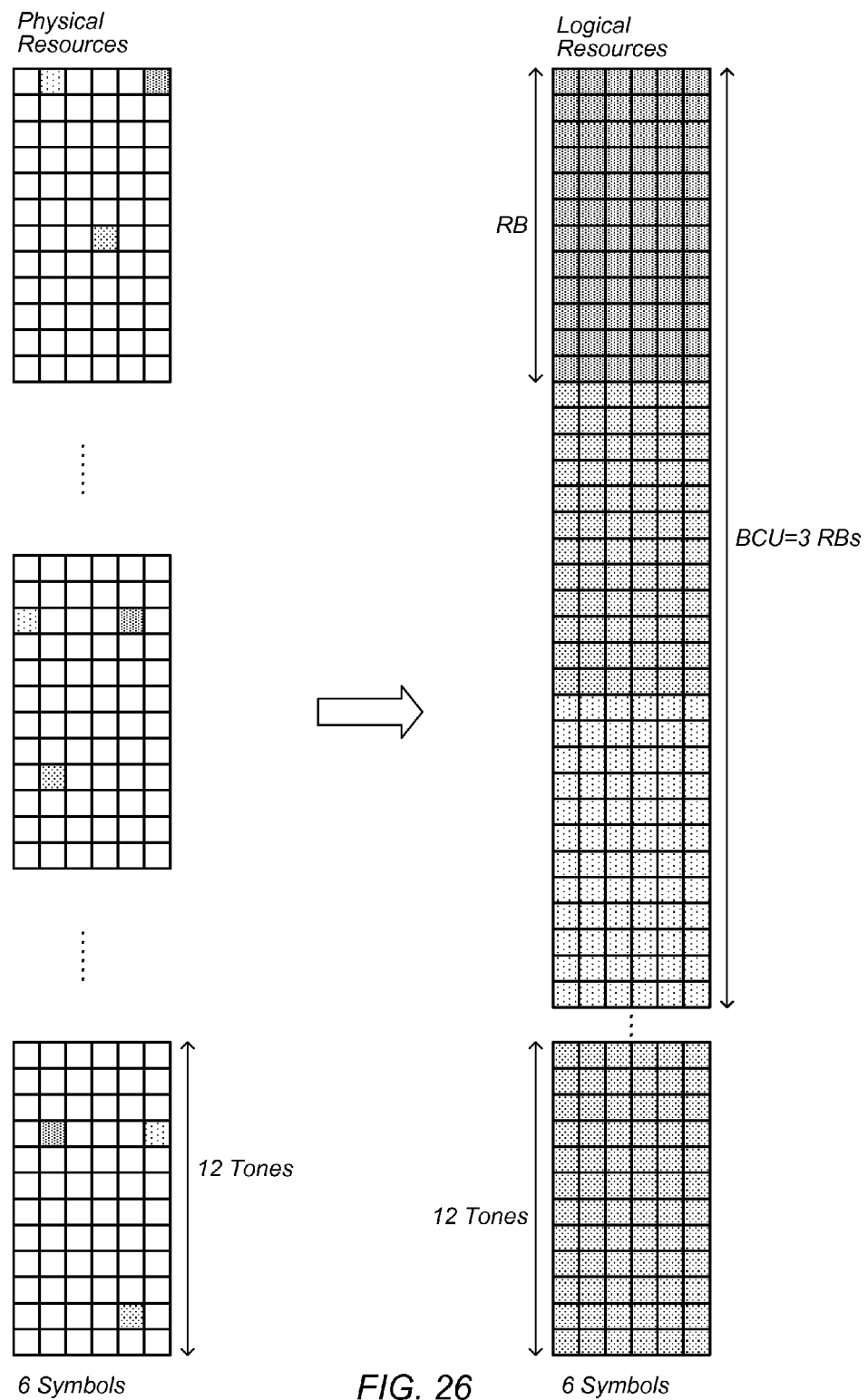
FIG. 26 shows a Mapping of Physical to Logical Resources for a Diversity Zone.
Figure 27:
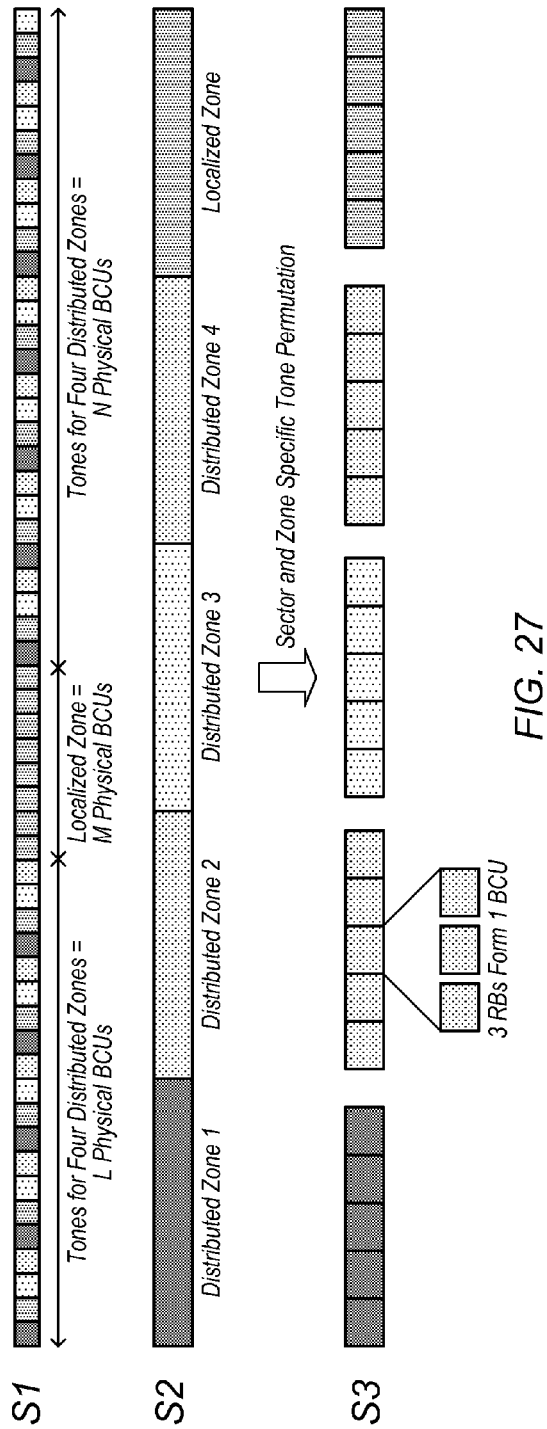
FIG. 27 illustrates one embodiment of a channelization procedure.

The hopping pattern is always confined within a zone.
For SFN transmission, the hopping pattern is the same in the corresponding zones in sectors that are involved in the SFN transmission.
For FFR the hopping pattern is different for different sectors.
Each zone has a one-dimensional ordered list of resources, in units of Basic Channel Units (BCU).
Basic Channel Unit (BCU):
A BCU consists of 3 resource blocks (RB), where a RB is 12 tones and 6 OFDM symbols. The details of the RB definition and the pilot design are described in a separate contribution (see C80216m-08_172).
For a 10 MHz system, there are 24 BCUs.
In the localized zone, a BCU is formed from contiguous physical tones.
In the diversity zone, a BCU is formed from physical tones that are spread over the entire zone.
Each BCU spans over all OFDM symbols in a sub-frame.
The partitioning of resources between the localized and diversity zone is in units of BCUs.
Defining a BCU size of 3 RBs has the following advantages.
This BCU size is an adequate size for proper channel estimation using common pilots.
This RB size provides enough granularity and flexibility for VoIP assignments (see C802.16m-08_177).
For group assignments, such as VoIP, groups are allocated in units of BCUs, whereas individual VoIP users can be allocated resources in units of RBs.
For non-VoIP assignments, the resource unit does not have to be as granular.
The resources are assigned using a combination of a multicast message and separate unicast messages for each assignment. The details of the control channel are described in a separate contribution (see control channel contribution 080216m-08_176).
FIG. 26 shows a Mapping of Physical to Logical Resources for a Diversity Zone. Each RB consists of tones that are evenly spread over the entire bandwidth. The tones from two adjacent logical RBs are defined so that the distance between tones is maximized.
Channelization Procedure
Step 1: The sub-carriers in a band are partitioned between localized zone and diversity zone in units of physical BCUs, i.e. 36 tones. The physical tones in the band are assigned to each zone by first assigning contiguous tones, in units of BCUs, for the localized zones and evenly distributing the remaining tones for distributed zones. The assignment of physical tones to each zone can hop from time to time, e.g. symbol to symbol or set of symbols to symbols, frame by frame etc.
Step 2: Once the zones are formed by a set of physical tones, the physical tones are permuted with a sector and zone specific permutation to map to logical tones.
Step 3: An ordered list of RBs is then formed for each zone where each RB consists of a set of logical tones. BCUs are formed by grouping 3 RBs.
FIG. 27 shows one embodiment of the channelization procedure.
Step 1 (S1): physical tones are assigned to zones;
Step 2 (S2): logical tones of each zone are formed by permutation;
Step 3 (S3): BCUs are formed from logical tones of each zone.

Figure 28:
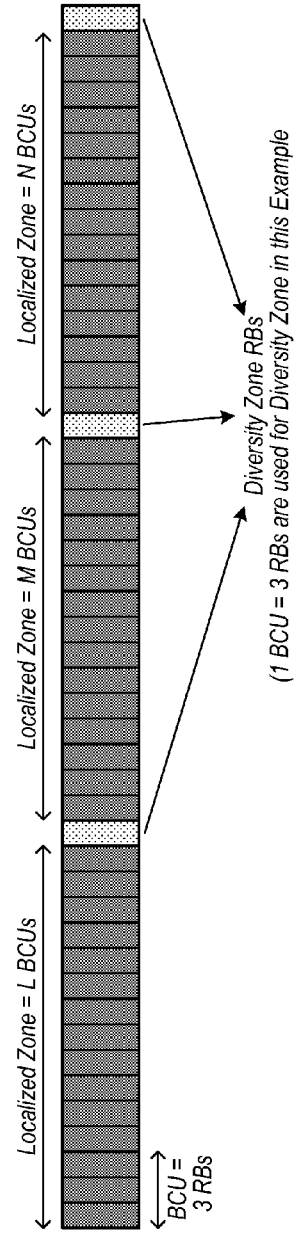
FIG. 28 illustrates an embodiment of an alternative channelization procedure.
Figures 29, 30A, 30B:
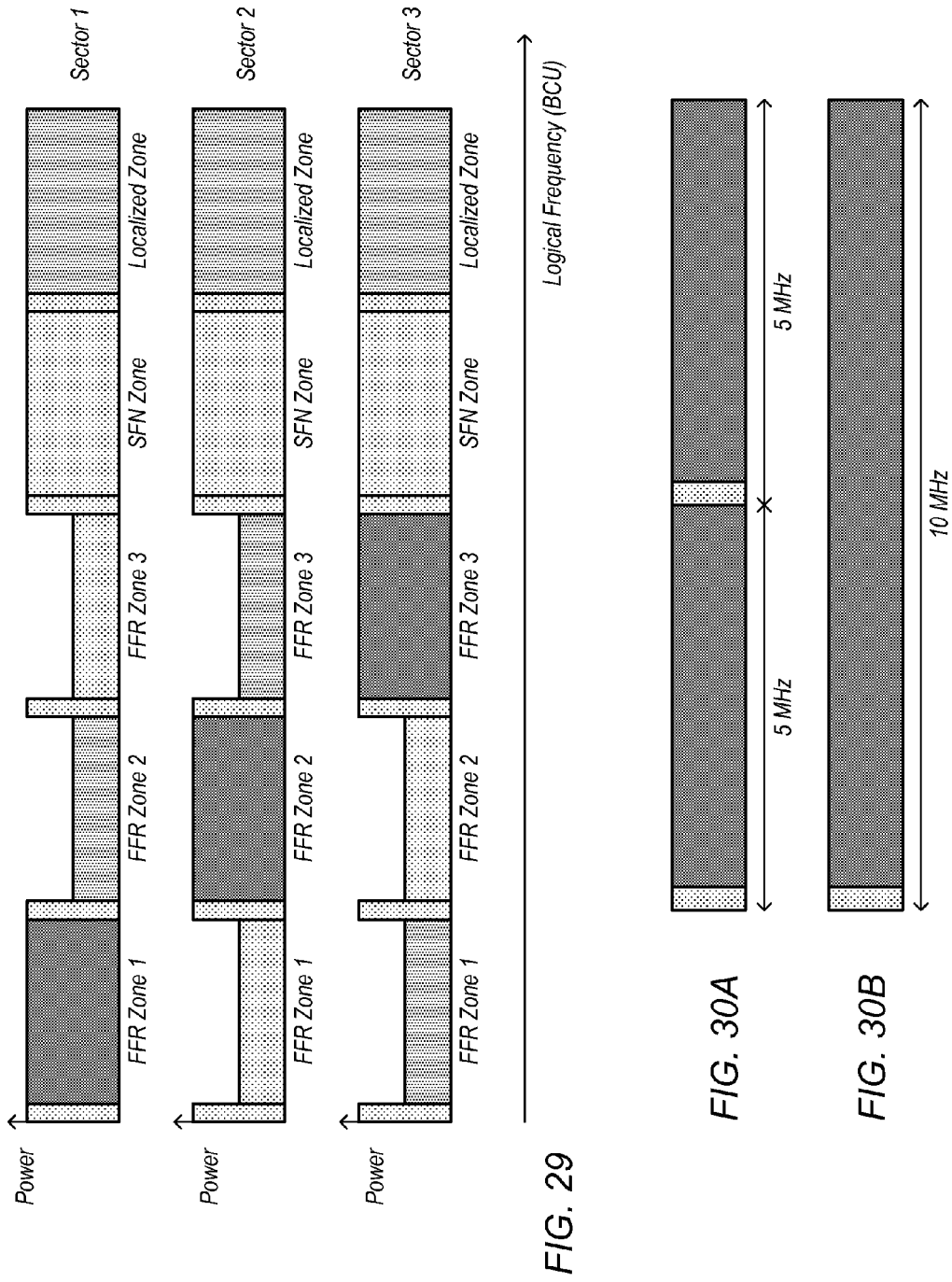
FIG. 29 illustrates power vs. logical frequency (BCU) for three sectors.
FIG. 30A illustrates an option where each carrier has a separate control channel.
FIG. 30B illustrates an option where a single control channel is used for multiple bands.

Channelization Procedure (Alternative)
In a band, if the diversity zone is a size of one or two BCUs, then the RBs used to form the BCU s can be distributed across the band. This improves the diversity order of the logical BCUs.
To improve channel estimation in each of the disjoint diversity RBs, a high density pilot pattern should be used in these RBs.
See FIG. 28, which illustrates an embodiment of the alternative channelization procedure.
Zone Configuration
The figure below illustrates how the different zones can be configured in one sub-frame.
A separate control channel is contained within each zone.
The control channel spans all OFDM symbols.
The FFR zones can be either diversity or localized zones.
See FIG. 29, which illustrates an example of power vs. logical frequency (BCU) for each of three sectors.
Channelization for Multi-Carrier
In multi-carrier operation there are two options.
In option 1, each carrier can have a different channelization depending on number of zones that are configured. In this case, each carrier will have a separate control channel.
In option 2, the channelization can span multiple bands. This case is used for transmissions to wide band users. In this case, a single control channel can be used.
FIG. 30A illustrates the option where each carrier has a separate control channel.
FIG. 30B illustrates the option where a single control channel is used for multiple bands.

Appendix D: Proposal for IEEE 802.16M VOIP Control Channel

Document Number: IEEE S802.16m-08/xxx.
Date Submitted: 2008-03-17.
Source: Robert Novak, Mo-Han Pong, Sophie Vrzic, Dongsheng Yu, Jun Yuan, Anna Tee, Sang-Youb Kim.
Nortel Networks.
Venue: Orlando, US.
Base Contribution: IEEE C802.16m-08/xxx.
Purpose: Adopt the proposal into the IEEE 802.16m System Description Document.
Scope
This contribution presents control channel signaling design for the support of real-time services such as VoIP for IEEE 802.16m.
This contribution can be used in conjunction with the control channel signaling design [Control contribution] to form the complete 802.16m control channel design.
Introduction
Real-time service support is an essentially feature of 16m systems. Such services may include: VoIP; Gaming; Video telephony.
These services are characterized by delay sensitive data requirements, small throughputs, and relatively high number of users.
The SRD requirements necessitate efficient control channel signaling design with capability of accommodating high numbers of users.
Efficient multiplexing of users on the UL and DL is necessary to ensure high capacity for such services.
16m VoIP SRD requirements: 1.5× reference system capacity; 30 users/MHz/sector.

Control channel design for real-time service can be different than those use for packet data, but must be able to be used simultaneously in order to support mixed traffic scenarios.

Background

Due to the relatively larger number of simultaneous VoIP users, it is imperative that the 16m control channel structure for VoIP be designed such that the overhead per HARQ transmission assignment must remain on the order of a few bits. In addition, many transmission parameters such as packet and modulation schemes may be common to all VoIP users and therefore do not need to be signaled.

Explicit signaling with conventional unicast control signaling used for data packet transmissions, while generally power efficient, can be prohibitive due to larger overhead associated with additional transmission parameters not necessary for VoIP.

Broadcast methods can eliminate many of these common fields but suffer from inefficient transmission to both cell edge and high geometry user simultaneously.

Current methods in 802.16e do not have specific signaling support for VoIP, and as a results the signaling overhead is large. This allows for maximum flexibility and specification of VoIP packet allocation, however it is capacity limiting. This is due to the large broadcast fixed overhead, as well as the considerable signaling overhead per HARQ transmissions.

Figure 31:
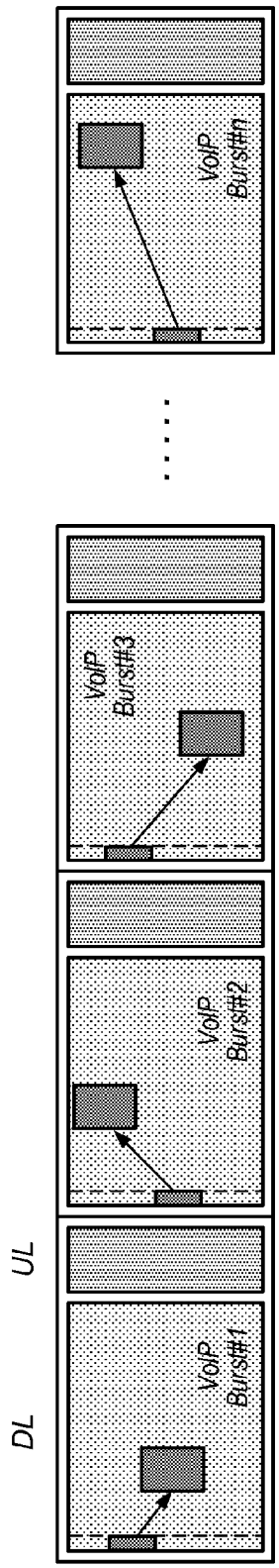
FIG. 31 illustrates the use of sub-maps in a legacy 802.16e system.

The legacy 16e system can use sub-MAPS to target several geometry groups separately, however the overhead limitation exists even with the use of sub-MAPS. FIG. 31 illustrates the use of sub-maps in a legacy 802.16e system.

For a 1×2 IEEE 802.16e system, the DL overhead with 140 users per link, and 10% re-transmission rate:

MAP overhead corresponds to 230 slots (64%); and

Using 3 sub-maps corresponds to 144 slots (40%).

Multi-cast methods, such group signaling methods as specified for 3GPP2 UMB systems, are useful in that the number of bits per assignment is relative small, while the use of multiple groups allow targeting of different of geometries to improve power efficiency. Efficient multiplexing of group resources is needed to maintain this power efficiency.

In some cases, assignment modifiers may be desirable to enhance system features or reduce hypotheses in blind detection of a transmission. Such modifiers can be useful for group allocations however in many cases, the number of assignments for a group is unknown prior to bitmap reception and ultimately require significant bit-padding in order to make use of these fields.

Proposal

This contribution proposes a group-based control channel framework for VoIP and real-time services. The proposal combines the efficiency and flexibility of unicast assignment by maintaining small groups and adding assignment modifiers, as well reduces control overhead and messages by using group-based assignment.

The group signaling methods can be integrated with a dynamic resource partition framework [Control Channel contribution] to provide efficient multiplexing of different multi-cast groups, and well as data packet traffic. Assignment modifiers can also be added to group signaling with minimum field padding in this proposal.

Proposal for 16m

Group-based assignment (bitmap).

Allow efficiently signaling to many VoIP users simultaneously.

Signaling only non-persistent assignments/transmissions.

Assignment modifier to allow addition specification of transmission.

Persistent allocation.

Predefined resource for certain VoIP transmissions or assignments to reduce signaling.

Occupied resource indicated by resource availability bitmap (RAB).

Multiplexing of group resources achieved by resource partitioning.

Flexible group resource assignment size and multiplexing by signaling partition sizes.

Hypothesis detection of group bitmaps allows flexibility in group partition location.

Non-Persistent Group Assignment

Group assignment is used to benefit large number of users.

A group is signaled by a group bitmap.

Each location in the bitmap is assigned to a user. The value of the bit for each user indicates whether the user is being assigned resources ('1'), or not being assigned resources ('0').

The first indicated assignment is assigned to the first available resource(s), the second indicated assignment is assigned to the second available resource(s).

Figure 32:
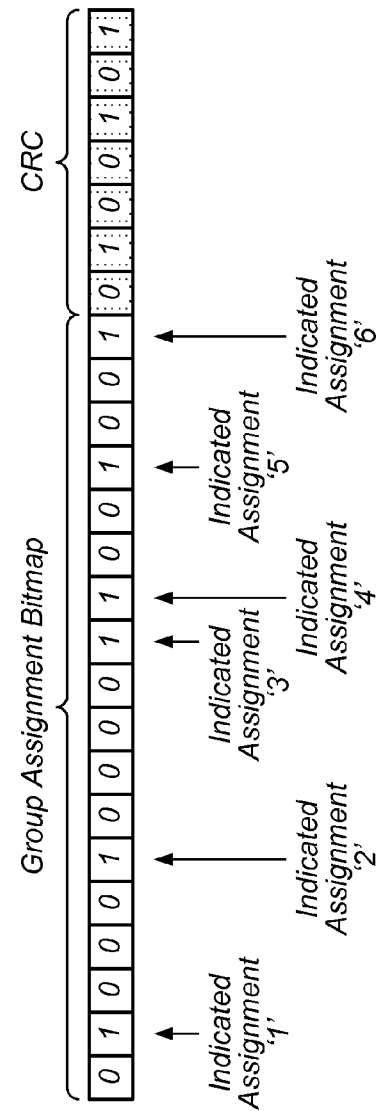
FIG. 32 gives an example of a group assignment bitmap.

See FIG. 32, which gives an example of a group assignment bitmap.

Each group bitmap has its own set of resources (i.e. different resource segment).

Improve flexibility by hypothesis detection of group bitmaps.

For DL assignments, a user will try to decode the start of each resource segment with its group ID attempting to find its group resource assignment.

For UL assignments, a user will try to decode each possible position for a control message in the UL assignment control segment with its group ID attempting to find its group resource assignment.

Allows bitmaps to be sent as needed on a 16m mini-slot and on different resource location.

Easy multiplexing of group resource facilitates the use of many groups.

(1) Groups based of service class. Some services require frequent transmission (VoIP), others less frequent.

(2) Groups based on geometry. Power efficiency.

(3) To reduce signaling, groups may also have the same attributes (useful for VoIP): MIMO mode; Resource allocation size; and MCS.

(4) A specific group assignment bitmap may be omitted if no users of that group require assignment.

Users are assigned to groups by group configuration message. Message indicates size of bitmap, bitfields to be included, and attributes.

Supporting Features for Group Assignments

Assignment Related Fields:

Each field is linked to number of indicated assignments of the bitmap, which can be derived from the partition size.

Hence each user can determine the field/index sizes dynamically.

(1) Supplemental Transmission Information Field (STIF): Up to 2 bits to indicate new packet transmissions, multiple packets or packet start position.

(2) Resource permutation index: Index linked to table of possible resource allocations sizes to indicated assignment in bitmaps.

Allows dynamic resource size for bitmaps allocations.

(3) Users set index: Index that shuffles indicated assignments. Can be to create "pairs" or sets of users. Can be used to assigned specific resources to specific users. Can be used in MIMO applications.

Group Related Field: UL resource/partition index.

Indicates the resource partition assigned to the group bitmap.

Multiple groups can be assigned to the same partition.

Supplemental Transmission Information Field (STIF)

(1) Indicates one (or more) of:

(a) new packet toggle (NPT) (multi-state toggle), which prevents ambiguity of transmission to user in case of ACK-JNAK error as it changes values each time a new packet is started;

(b) multiple packets (MP), which allows BS to specify that 2 packets are being transmitted to a user, also indicates to other users of the group that this assignment will uses twice the resources;

(c) packet start frame (PSF) within superframe, which indicates the frame within the superframe on which the first HARQ packet transmission occurred. This indication simplifies hypothesis detection in the presence of control signaling errors;

(d) Subpacket HARQ transmission index (SPID), which indicates the subpacket ID in for HARQ transmissions. Enables asynchronous IR HARQ packet transmissions.

(2) The mode is configured for each group bitmap. Can also be configured as one-bit field (2 state) for 1 mode, or 2-bit field (4 state) which can be configured to support one or more of the above modes.

Figures 33, 34:
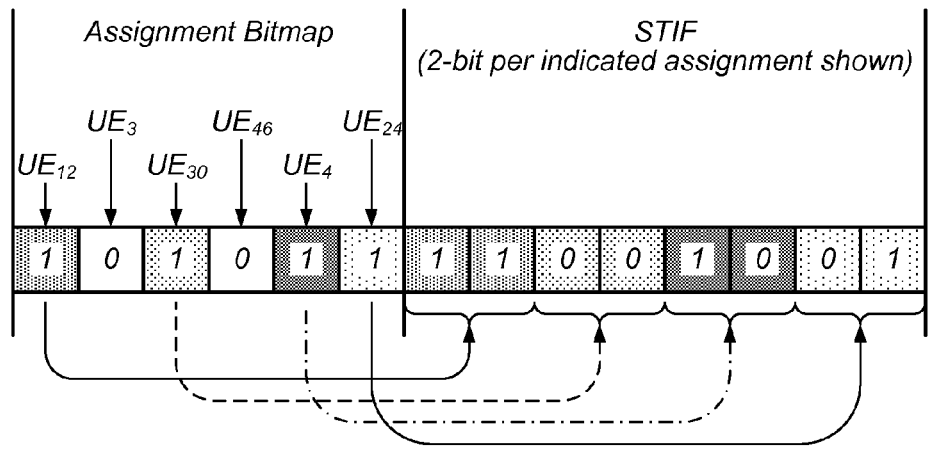
FIG. 33 illustrates an example of an assignment bitmap and a supplemental transmission information field (STIF).
FIG. 34 is a table illustrating an example of partition divisions, corresponding index numbers and corresponding bitfields.

See FIG. 33 illustrates an example of the assignment bitmap and the supplemental transmission information field (STIF).

Resource Permutation Index

This field may be present and may be used to assign different numbers of resources to users of a given group.

For a particular number of resources within the group assignment segment, a table can be created to indicate possible resource partitions to different users within the group.

This field signals the index associated with resource partitions of the group assignment.

For example, for the case of a partition size of 4 resources, a table can be created linking possible with an index. If the group is configured to use this filed, by noting the partition size and the minimum resource division size, the user can determine that a 3-bit field is appended to the bitmap. Hence the size of the index is dynamically flexible, and is associated with the partition size See FIG. 34, which is a table illustrating an example of partition divisions, corresponding index numbers and corresponding bitfields.

Users Sets Index

Reordering, or Creating Users Sets within Bitmap

The field indicates an index that corresponds to combinations of pairs or sets of assigned users.

Users with indicated assignments are combined into pairs, triples, quadruples, etc. . . . . .

This allows selected multiple users to be assigned to the same resource.

Without this index the users are paired in the order of bitmap positions.

For a number of indicated assignments, a table can be created of possible pairs or sets of users.

Example:

The bitfield "01", indicates that assignment 1 and 3 are paired on the first resource, and assignment 2 and 4 are paired on the second resource.

Hence, UE12 and UE46 are paired on the first resource, and UE30 and UE24 and paired on the second resource.

Figures 35, 36:
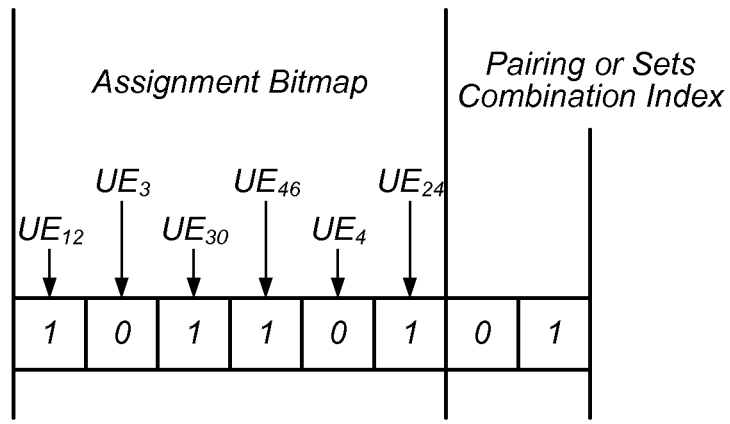
FIG. 35 illustrates an example of an assignment bitmap and a pairing or sets combination index.
FIG. 36 is a table showing an example of user combinations, corresponding index numbers and corresponding bitfields.

FIG. 35 illustrates an example of the assignment bitmap and the pairing or sets combination index. FIG. 36 is a table showing an example of user combinations, corresponding index numbers and corresponding bitfields.

UL Resource/Partition Index: Bitfield on UL Control Message that Points to Resources Assignment group bitmap messages are appended by a bit field specifying the UL partition number for the assignment.

Multiple bitmaps can be assigned to the same partition. Multiple groups can be assigned to the same partition to support collaborative spatial multiplexing (CSM).

Group assignments with indicated assigned resources greater than the partition size, start from the end of the partition and allocate resource across to the partition to the beginning, and then continue starting again from the end of the partition.

Mobiles can derive total number of assigned resources to group from bitmap, and compare with indicated resource partition size.

Method allows efficient packing of different sized group assignments.

Users ordering index can also be used to allocate users in a specific order.

For a number of indicated assignments, a table can be created of possible ordering of users.

user ordering index may also be used to "shuffle" the assignments of one or more group bitmaps to allow further control over which users are grouped together for optimization.

Index to be appended to high geometry bitmap to minimize overhead. In order to allow derivation of field size, index applies to only one CSM layer.

Ordering index is a specific case of user set index, with user set size equal to 1.

Figures 37, 38:
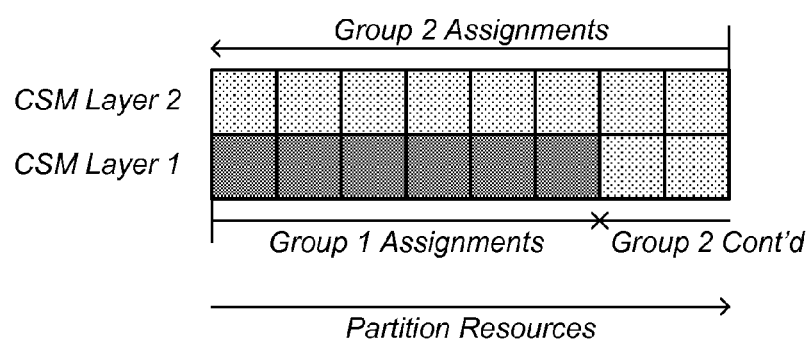
FIG. 37 is a table showing assignment ordering examples, corresponding index numbers and corresponding index bitfields.
FIG. 38 illustrates the multiplexing of unequal assignments.

FIG. 37 is a User Ordering Index Table showing assignment ordering examples, corresponding index numbers and corresponding index bitfields.

FIG. 38 gives an example of the multiplexing of unequal assignments. Group 1 corresponds to 6 assigned resources. Group 2 corresponds to 10 assigned resources. The partition corresponds to 8 resources.

Persistent Resource Assignment

Persistent resource assignment can be used for low geometry users.

Persistent assignment does not require control signal after initial configuration.

All HARQ transmissions are sent on periodically occurring persistent assignment.

Figure 39:
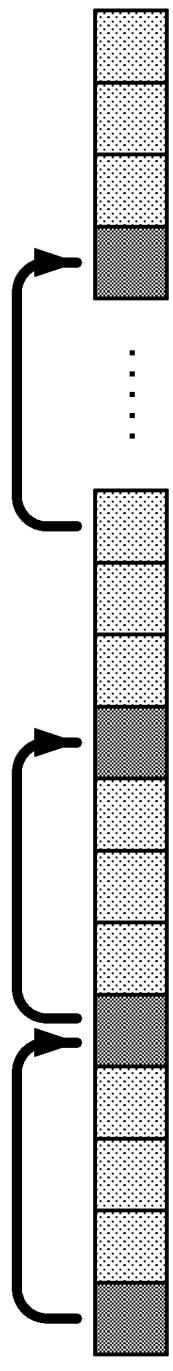
FIG. 39 illustrates an example of persistent resource assignment.

FIG. 39 illustrates an example of persistent resource assignment.

Persistent sub-zone allows multiplexing of persistent resource and non-persistent assignments. A resource availability bitmap is employed to indicate which specific resources are available within the partition within the persistent sub-zone.

Persistent assignment for first HARQ transmission, or re-transmissions is also supported. Persistent resources for first HARQ transmissions are configured at initial assignment, and re-transmissions are signaled non-persistently by group assignment.

Assigned/deassigned by unicast control message.

Overview of VoIP Control Channel within Resource Partition Framework

VoIP transmissions can be persistent assignments, or non-persistent assignments signaled within specific resource partitions.

Group assignment using a bitmap is used for non-persistent VoIP assignments. Each group is assigned a separate resource partition.

Persistent assignments are indicated to other users by resource availability bitmap (RAB).

Division and identification of available resources is indicated by the multicast control segment (MCCS). Partition of zones is signaled by combination index (CI) which signals the resource partitions within the persistent and non-persistent zones.

The CI is concatenated and encoded with a resource availability bitmap (RAB) which indicates the available resources in the persistent sub-zone. The RAB is a bitmap that indicates which resources are available, and which are occupied with a persistent HARQ transmission. Persistent resources that are unused due to packet arrival Jitter, silence state, or early termination of HARQ transmissions are shown as available.

The resource partitions indicated by the CI divide the set of resources remaining after resources indicated as occupied by the RAB are removed from the resource list. The size of the persistent zone is carried in the secondary broadcast channel.

Figure 40:
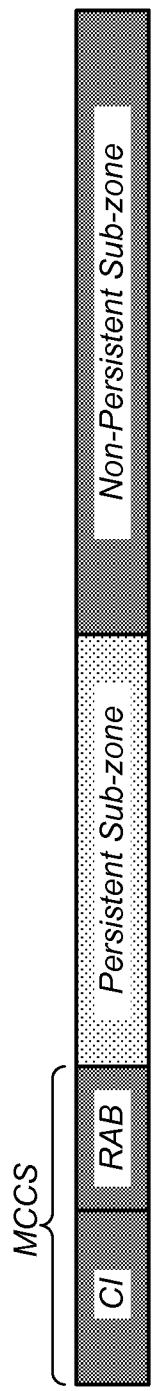
FIG. 40 illustrates an example of a multicast control segment (MCCS) including a combination index (CI) and a resource availability bitmap (RAB).

FIG. 40 illustrates an example of a multicast control segment (MCCS) including a combination index (CI) and a resource availability bitmap (RAB).

Resources Map—DL+UL Assignments

Figure 41:
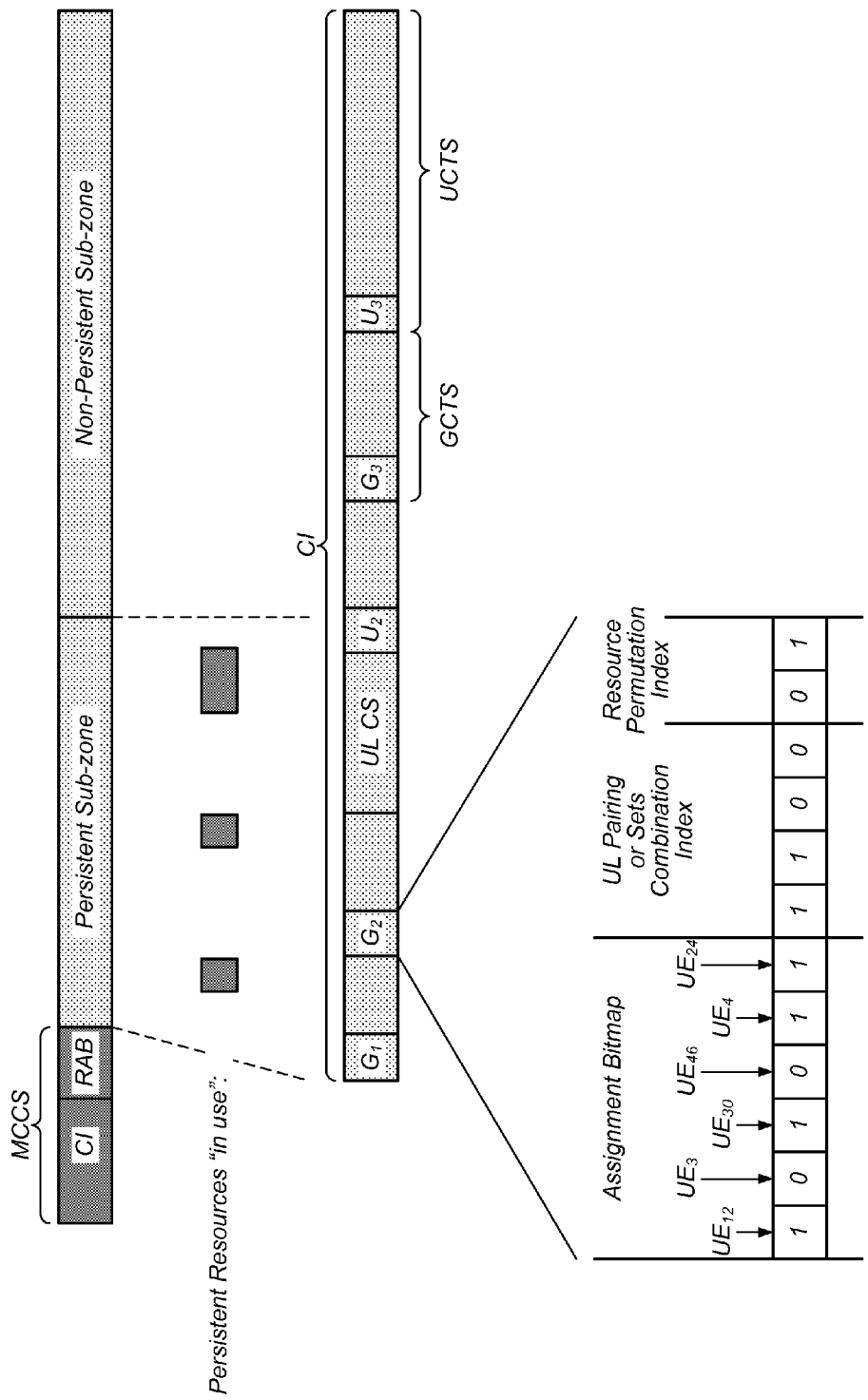
FIG. 41 illustrates an example of a combination index (CI) including group assignment messages (denoted $G_1$, $G_2$, $G_3$), an uplink control segment (UL CS) and unicast assignment messages (denoted $U_2$ and $U_3$).

See FIG. 41, which illustrates an example of a combination index (CI) including group assignment messages (denoted $G_1$, $G_2$, $G_3$), an uplink control segment (UL CS) and unicast assignment messages (denoted $U_2$ and $U_3$). Also, an example of a group assignment message (see $G_2$) is given.

In FIG. 41, the following notations are used:
MCCS=Multicast Control segment;
CI=Combination Index;
RAB=Resource availability bitmap;
UCTS=Unicast control and traffic segment;
U=Unicast assignment message;
GCTS=Group control and traffic segment;
G=Group assignment message;
UL CS=Uplink Control segment.

The available resources for each group assignment are indicated by separate resource partitions per mini-frame.

Resources for different groups are dynamically multiplexed.

A resource availability bitmap (RAB) may also be employed indicate which specific resources are available within the partition.

Resources Map—UL Control Segment

FIG. 42 illustrates an example of resources map—uplink control segment. $U_1$, $U_2$ and $U_3$ are unicast assignment messages. $G_1$, $G_2$, $G_3$ and $G_4$ are group assignment messages. In FIG. 42, the following notations are used:
CI=Combination Index;
RAB=Resource availability bitmap;
U=Unicast assignment message;
G=Group assignment message.

UL Assignment block is located in a DL resource partition. Partition contains CI, RAB, and unicast/group assignments.

Combination index indicates the resource partitions on the Uplink.

RAB indicates resources "in use" by persistent assignments, and resources available.

Resource partitions specified in CI excluded resources indicated as "in use" by the RAB.

For group assignment messages (and unicast):
Assignment messages are appended by a bit field specifying the UL partition number for the assignment.

Multiple groups can be assigned to the same partition to support collaborative spatial multiplexing (CSM).

Unicast messages precede group messages in order to facilitate ACK/NAK operation.

Group message length is set to be multiple of unicast length.

VoIP Packet Sizes

Resource block size 72 (12×6) bits as discussed in [pilot/RB contribution] provides flexibility in code rate for assignment. This RB size can be assigned in units of 3 RB's.

Downlink (DL):
(A) 2 transmit antennas→6% pilot overhead.
(B) 320 bit VoIP packet size (AMR full rate). 2 Options for resource size for QPSK:
3 RB=1st transmission code rate 0.788; and
4 RB=1st transmission code rate 0.59.
(C) 256 bit VoIP packet size (EVRC full rate). 2 Options for resource size for QPSK:
2 RB=1st transmission code rate 0.95;
3 RB=1st transmission code rate 0.63.

Uplink (UL):
(A) 2 transmit antennas→12% pilot overhead.
(B) 320 bit VoIP packet size (AMR full rate). 2 Options for resource size for QPSK:
3 RB=1st transmission code rate 0.84;
4 RB=1st transmission code rate 0.63.
(C) 256 bit VoIP packet size (EVRC full rate). 2 Options for resource size for QPSK:
3 RB=1st transmission code rate 0.67.

For both UL and DL, small RB size allows for multiple reliability options with QPSK, and allows for adaptation to pilot/codec requirements.

Majority of coding gain achieved after $2^{nd}$ IR transmission.

Assignment Overhead Comparison (Including CI)

Total Overhead for UL+DL resources (48.6 OFDM symbols) in TDD frame (1:1) partition.

Estimates assume full power transmission such that BW overhead is approximately equal to power overhead.

MCS, QPSK rate 1/2, with repetitions 1, 2, 4 and 6 for all schemes (WiMAX turbo encoder curves);

Overhead does not included any padding; or
12×6 RB size, 3 RB's per assignment.
UL overhead assumed to be same as DL overhead.
16m Group assignment entries assume:
(1) User divided into 16 bitmaps.
4 interlace based bitmaps, each with 14 geometry based bitmaps.
Lowest level maybe persistently assigned.
(2) New packet assignment modifier bit (2 bit per indicated assignment).
Transmission opportunities every 5 ms.
Without modifier, start frames are limited by increased hypothesis detection.

(3) 10-bit for CI:
  Persistent encoded with RAB and 16-bit CRC.
  Non-persistent encoded with 8-bit CRC.
UMB Group assignment entries assume:
(1) 1 geometry level for bitmap, RAB attached to lowest geometry level bitmap.
(2) Users from a geometry level divided into 8 bitmaps.
  4 interlace based bitmaps, each witl 12 start frames per 20 ms superframe.
  Allows packet start every 10 ms.
FIG. 43 is a table illustrating an assignment overhead comparison for different numbers of users.

Appendix E: Proposal for IEEE 802.16M Resource Allocation and Control for Multi-Carrier Operation Document Number: IEEE C802.16m-08/178.
Date Submitted: 2008-03-10.
Source: Sophie Vrzic, Mo-Han Fong, Robert Novak, Jun Yuan, Dongsheng Yu, Anna Tee, Sang-Youb Kim, Kathiravetpillai Sivanesan.
Nortel Networks.
Re: IEEE 802.16m-08/005—Call for Contributions on Project 802.16m System Description Document (SDD), on the topic of "Downlink Control Structures".
Purpose: Adopt the proposal into the IEEE 802.16m System Description Document.
Scope
This contribution presents the IEEE 802.16m resource allocation and control design for multi-carrier operation.
The resource allocation and control design for single carrier is presented in contribution C802.16m-08_176.
Overview
In multi-carrier operation, each carrier has its own control channel.
A mobile may be assigned one or more primary carriers for decoding the scheduling control information (see contribution on Resource Allocation and Control for Multi-Carrier C802.16m-08_178).
The mobile reads the multicast control segment in its primary carrier and then searches each partition to find its unicast assignment (see contribution on Resource Allocation and Control C802.16m-08_176).
The unicast assignment indicates whether or not the data is contained on this primary carrier or another carrier.
If data is contained on another carrier then the carrier and the partition number are indicated in the unicast assignment message on the primary carrier.
Data can be contained within the assigned partition of the primary carrier as well as the indicated carrier.
Multi-Carrier Control
In the example below, the mobile is assigned carrier 1 as its primary carrier.
The mobile reads the combination index on the primary carrier and using blind detection it decodes the unicast message in the second partition.
This unicast message indicates that the data is contained in the third partition of carrier 2.
The mobile must then decode the CI of carrier 2 to determine the location of the third partition.
FIG. 44 shows a unicast message on Carrier 1, where the unicast message indicates that data in contained in a third partition on Carrier 2.
The advantages of assigning secondary carriers are:
  System information does not have to be broadcast on secondary carriers;
  A preamble is not required on secondary carriers; and
  Introducing secondary carriers leads to reduced overhead since the same information does not have to be transmitted on multiple carriers.

When there is an active traffic transmission, the MS has to send ACK/NACK on the same carrier as the traffic was sent/received.
Asynchronous retransmissions do not have to be transmitted on the same carrier. Retransmissions are signaled on the primary carrier, but can be scheduled on either the primary or secondary carriers.
For resource adaptive synchronous HARQ, there are three options for multi-carrier control.
Option 1: Resource adaptive synchronous retransmission is on the same carrier as original transmission (the MS has to monitor the secondary carrier and its own primary carrier).
(a) MS needs to do blind decoding for new packet (e.g. 3 message lengths) of all segments on the primary carrier.
(b) MS needs to do blind decoding for retransmission packet (1 message length) of all segments on the secondary carrier.
Option 2: Resource adaptive synchronous retransmission on the primary carrier (original transmission on another carrier).
(a) Need to signal the original carrier ID (3 bits) and the resource ID in the original carrier (5 bits).
(b) MS needs to do blind decoding of both new packet and retransmission packet (total 4 message length) of all segments on primary carrier.
Option 3: Resource adaptive sync retransmission on any other carriers.
(a) Need to signal the original carrier ID (3 bits), the resource ID in the original carrier (5 bits), the destination carrier ID (3 bits) and the resource ID in the destination carrier (5 bits).
(b) MS needs to do blind decoding of both new packet and retransmission packet (total 4 message length) of all segments in primary carrier.
All options have the same number of blind decoding attempts.
Option 1 has the least overhead but least flexibility.
Option 3 has the most overhead and is most flexible. But option 3 can be achieved by asynchronous retransmission, which has more flexibility.
Conclusion is to use Option 1 for resource adaptive synchronous HARQ because:
(a) Option 2 is not flexible to adapt the CQI of different carriers.
(b) Load balancing is a long term operation. The assigned carrier does not need to change dynamically.
The CQI feedback should be per carrier to keep the design systematic:
(a) The carrier used for CQI measurement and feedback is configured by the BS.
(b) The MS monitors the superframe configuration control information on the primary and secondary carriers.
(c) Primary carriers are for mobiles that are not in active traffic transmission and don't need to feedback information, e.g. in sleep mode and idle mode.
In summary, the notion of primary/secondary is useful:
(a) Save overhead of broadcasting system information on the secondary carrier.
(b) Save the number of blind detection attempts required.
The MS only monitors the frame control from one carrier. This reduces the number of control packets to decode or blind detections.

Those skilled in the art will recognize improvements and modifications to the embodiments of the present invention. All such improvements and modifications are considered within the scope of the concepts disclosed herein and the claims that follow.

What is claimed is:

1. A mobile station comprising:
   one or more antennas; and
   a transceiver coupled to the one or more antennas, and configured to receive signals on a plurality of carriers comprising a primary carrier and one or more secondary carriers, wherein each of the carriers:
   includes a respective band of subcarriers,
   has corresponding synchronization channels for synchronization of the carrier, and
   has corresponding control channels,
   wherein for the one or more secondary carriers, the transceiver is further configured to receive different types of control information from the primary and the one or more secondary carriers, including receiving at least part of system information for the primary carrier and the one or more secondary carriers on the primary carrier, and receiving dynamic downlink and uplink control information on each secondary carrier for the respective secondary carrier;
   wherein the at least part of system information includes initial access parameters and essential static physical layer configuration information, wherein the dynamic downlink and uplink control information comprises downlink and uplink resource allocation, and uplink power control information;
   wherein the transceiver is further configured to, for each of the primary and the one or more secondary carriers:
   generate channel quality information (CQI) for the carrier based on pilot signals in the carrier; and
   transmit the CQI for the carrier;
   wherein the one or more CQIs for the primary carrier and the one or more secondary carriers are transmitted using a particular one of either the primary carrier or the one or more secondary carriers, wherein the particular carrier is configured based on instruction received from the base station.

2. The mobile station of claim 1, wherein the transceiver is further configured to:
   receive data traffic on a given one of the carriers; and
   send ACK/NACK feedback on the given carrier, wherein the ACK/NACK feedback indicates positive or negative acknowledgement of receipt of the data traffic.

3. The mobile station of claim 1, wherein the transceiver is further configured to:
   transmit data traffic on a given one of the carriers; and
   receive ACK/NACK feedback on the given carrier, wherein the ACK/NACK feedback indicates positive or negative acknowledgement of receipt of the data traffic by the base station.

4. The mobile station of claim 1, wherein the transceiver is further configured to:
   monitor only the primary carrier when the mobile station is in sleep mode or idle mode.

5. The mobile station of claim 1, wherein the one or more CQIs generated respectively for the one or more carriers are transmitted on a first of the secondary carriers.

6. The mobile station of claim 1, wherein the at least part of system information further includes neighbor base station information and at least one of physical access control layer and medium access control layer system configuration information.

7. The mobile station of claim 2, wherein retransmission of the data traffic received on the given carrier is on the same carrier as the original transmission.

8. A method for operating a mobile station, wherein the mobile station comprises one or more antennas and a transceiver coupled to the one or more antennas, the method comprising:
   performing operations using the transceiver, wherein said operations include:
   receiving signals on a plurality of carriers comprising a primary carrier and one or more secondary carriers, wherein each of the carriers includes a respective band of subcarriers, has corresponding synchronization channels for synchronization of the carrier, and has corresponding control channels;
   for the one or more secondary carriers, receiving different types of control information from the primary carrier and the one or more secondary carriers, including receiving at least part of system information for the primary carrier and the one or more secondary carriers on the primary carrier, and receiving dynamic downlink and uplink control information on each secondary carrier for the respective secondary carrier, wherein the at least part of the system information includes initial access parameters and essential static physical layer configuration information, and wherein the dynamic downlink and uplink control information comprises downlink and uplink resource allocation, and uplink power control information;
   for each of the primary and the one or more secondary carriers, generating channel quality information (CQI) for the carrier based on pilot signals in the carrier, and transmitting the CQI for the carrier;
   wherein the one or more CQIs for the primary carrier and the one or more secondary carriers are transmitted using a particular one of either the primary carrier or the one or more secondary carriers, wherein the particular carrier is configured based on instruction received from the base station.

9. The method of claim 8, wherein the operations also include:
   receiving data traffic on a given one of the carriers; and
   sending ACK/NACK feedback on the given carrier, wherein the ACK/NACK feedback indicates positive or negative acknowledgement of receipt of the data traffic.

10. The method of claim 8, wherein the operations also include:
    transmitting data traffic on a given one of the carriers; and
    receiving ACK/NACK feedback on the given carrier, wherein the ACK/NACK feedback indicates positive or negative acknowledgement of receipt of the data traffic by the base station.

11. The method of claim 8, wherein the one or more CQIs generated respectively for the one or more carriers are transmitted on a first of the secondary carriers.

12. The method of claim 8, wherein the at least part of system information further includes neighbor base station information and physical/medium access control layer system configuration information.

13. The method of claim 8, wherein the operations also include: monitor only the primary carrier when the mobile station is in sleep mode or idle mode.

14. The method of claim 9, wherein retransmission of the data traffic received on the given carrier is on the same carrier as the original transmission.

15. A non-transitory memory medium for operating a mobile station, wherein the mobile station comprises one or more antennas and a transceiver coupled to the one or more antennas, wherein the memory medium stores program instructions, wherein the program instructions when executed by a processor, cause the processor to implement:
    receiving signals on a plurality of carriers, wherein each of the carriers includes a respective band of subcarriers, has corresponding synchronization channels for synchronization of the carrier, and has corresponding control channels;
    for the one or more secondary carriers, receiving different types of control information from the primary and the or more secondary carriers, including receiving at least part of system information for the primary carrier and the one or more secondary carriers on the primary carrier, and receive dynamic downlink and uplink control information on each secondary carrier for the respective secondary carrier, wherein the at least part of system information includes initial access parameters and essential static physical layer configuration information, and wherein the dynamic downlink and uplink control information comprises downlink and uplink resource allocation, and uplink power control information;
    for each of the primary and the one or more secondary carriers, generating channel quality information (CQI) for the carrier based on pilot signals in the carrier, and transmitting the CQI for the carrier;
    wherein the one or more CQIs for the primary and the one or more secondary carriers are transmitted using a particular one of either the primary carrier or the one or more secondary carriers, wherein the particular carrier is configured based on instruction received from the base station.

16. The memory medium of claim 15, wherein the one or more CQIs generated respectively for the one or more carriers are transmitted on a first of the secondary carriers.

17. The memory medium of claim 15, wherein the program instructions when executed by the processor, further cause the processor to implement:
    receiving data traffic on a given one of the carriers; and
    sending ACK/NACK feedback on the given carrier, wherein the ACK/NACK feedback indicates positive or negative acknowledgement of receipt of the data traffic.

18. The memory medium of claim 15, wherein the program instructions when executed by the processor, further cause the processor to implement:
    transmitting data traffic on a given one of the carriers; and
    receiving ACK/NACK feedback on the given carrier, wherein the ACK/NACK feedback indicates positive or negative acknowledgement of receipt of the data traffic by the base station.

19. The memory medium of claim 15, wherein the program instructions when executed by the processor, further cause the processor to implement:
    monitoring only the primary carrier when the mobile station is in sleep mode or idle mode.

20. The memory medium of claim 15, wherein the at least part of system information further includes neighbor base station information and at least one of physical access control layer and medium access control layer system configuration information.

* * * * *